(12) United States Patent
Sharma et al.

(10) Patent No.: US 11,847,904 B2
(45) Date of Patent: Dec. 19, 2023

(54) INTEGRATED SECURITY MANAGEMENT SYSTEM AND METHOD

(71) Applicant: 56 AI TECHNOLOGIES PRIVATE LIMITED, Bengaluru (IN)

(72) Inventors: Harshit Sharma, Delhi (IN); Sacheth Kadam, Bangalore (IN); Troels Licht, London (GB)

(73) Assignee: 56 AI TECHNOLOGIES PRIVATE LIMITED, Bengaluru (IN)

( * ) Notice: Subject to any disclaimer, the term of this patent is extended or adjusted under 35 U.S.C. 154(b) by 84 days.

(21) Appl. No.: 17/664,012

(22) Filed: May 18, 2022

(65) Prior Publication Data

US 2022/0375332 A1 Nov. 24, 2022

(51) Int. Cl.
| | |
|---|---|
| G08B 29/18 | (2006.01) |
| G06N 5/022 | (2023.01) |
| G07C 9/28 | (2020.01) |
| G08B 29/14 | (2006.01) |
| G06V 20/52 | (2022.01) |
| G08B 25/10 | (2006.01) |
| G06V 10/764 | (2022.01) |

(52) U.S. Cl.
CPC ........... *G08B 29/188* (2013.01); *G06N 5/022* (2013.01); *G06V 10/765* (2022.01); *G06V 20/52* (2022.01); *G07C 9/28* (2020.01); *G08B 25/10* (2013.01); *G08B 29/14* (2013.01)

(58) Field of Classification Search
None
See application file for complete search history.

(56) References Cited

U.S. PATENT DOCUMENTS 10,486,313 B2  11/2019 Deyle et al.

FOREIGN PATENT DOCUMENTS

CN    110807888 A    2/2020

*Primary Examiner* — Thomas S McCormack
(74) *Attorney, Agent, or Firm* — CHIP LAW GROUP

(57) ABSTRACT

An integrated security management system is provided. The system includes an application server and a plurality of sensors deployed in a geographical area. The application server receives first sensor data from the plurality of sensors and provide to a trained classification model as input and detects a security alert based on output thereof. The application server determines a patrol route that encompasses a location of security alert and transmits a surveillance request to electronic device of a security operator to patrol the patrol route and identifies one or more sensors that covers the location of the security alert and receives second sensor data therefrom based on location of the electronic device being same as location of the security alert. The application server further re-trains the classification model based on the second sensor data when feedback received from the electronic device indicates the security alert to be a false positive.

20 Claims, 11 Drawing Sheets

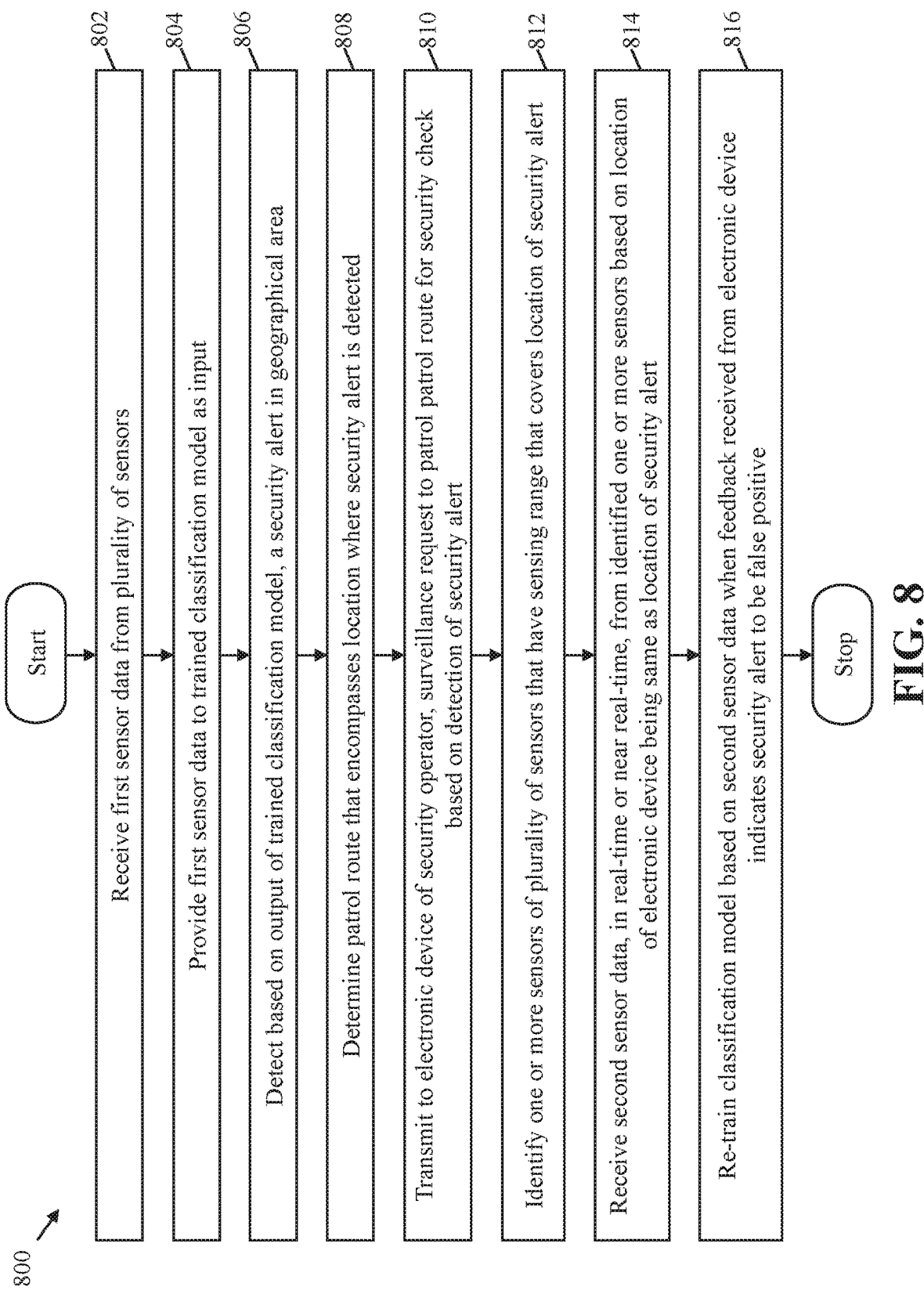

INTEGRATED SECURITY MANAGEMENT SYSTEM AND METHOD

CROSS-RELATED APPLICATIONS

This application claims priority of Indian Provisional Application Serial No. 202141022244, filed May 18, 2021, the contents of which are incorporated herein by reference.

FIELD

Various embodiments of the disclosure relate generally to security systems. More specifically, various embodiments of the disclosure relate to methods and systems for proactive security management.

BACKGROUND

Security constitutes an important aspect of the modern world. Lack of security may lead to undesirable events such as accidents, hazards, burglaries, thefts, or the like. Security systems typically include a combination of video surveillance and manual oversight by security personnel. For example, a security system in a residential society may involve security personnel observing live video feed captured by various cameras deployed in the residential society and patrolling the residential society.

Though the security system involves continuous manual oversight by security personnel, such an approach of maintaining security is perceptive to human error. For example, there might be instances where the security personnel may get involved in other activities and hence an undesirable incident may go unnoticed. In other words, the existing security systems are reactive in nature and fail to prevent occurrence of an undesirable incident in real time and act once the incident has already occurred. Moreover, in the interest of data storage capacity, the camera recordings are generally stored for a short time-interval, thus posing a challenge when a past event is to be evaluated in the reactive approach. Therefore, current security systems are neither efficient nor fool-proof.

In light of the foregoing, there exists a need for a technical and reliable solution that overcomes the abovementioned problems and ensures proactive and real-time security.

Limitations and disadvantages of conventional and traditional approaches will become apparent to one of skill in the art, through comparison of described systems with some aspects of the present disclosure, as set forth in the remainder of the present application and with reference to the drawings.

SUMMARY

Integrated security management systems and methods are provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 8 is a flowchart that illustrates a method of implementing the integrated security management system, in accordance with an exemplary embodiment of the disclosure.

DETAILED DESCRIPTION

Figure 1:
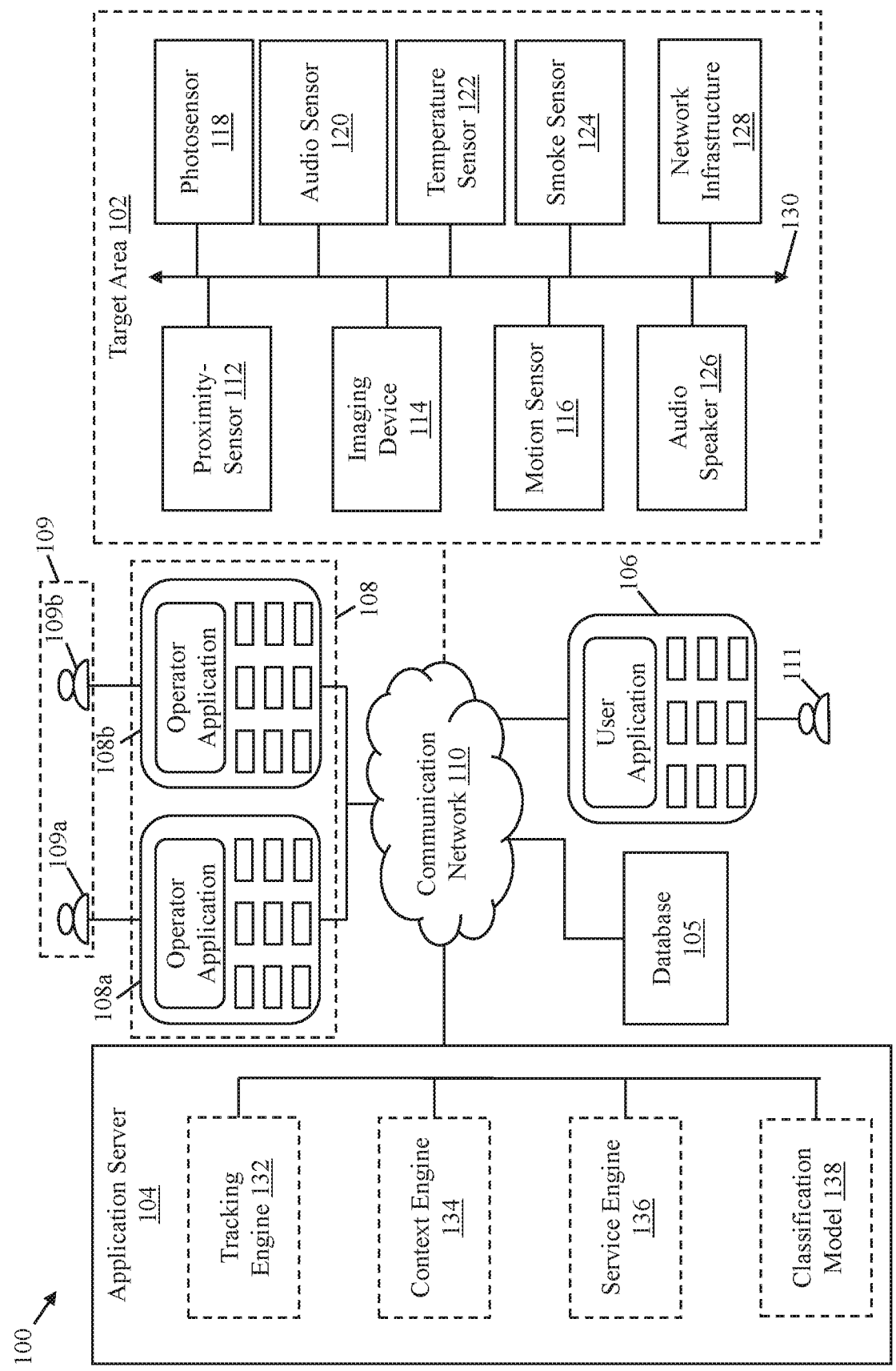
FIG. 1 is a block diagram that illustrates a system environment of an integrated security management system, in accordance with an exemplary embodiment of the disclosure.

Certain embodiments of the disclosure may be found in the disclosed systems and methods for implementing an integrated security management system. Exemplary aspects of the disclosure provide integrated security management systems and methods. An integrated security management system may include an application server that is communicatively coupled to a plurality of sensors that are deployed in a geographical area (for example, a target area). The plurality of sensors may collectively have a sensing range that covers the geographical area. The application server may be configured to receive first sensor data from the plurality of sensors and provide the first sensor data to a trained classification model as an input. The application server may be further configured to detect, based on an output of the trained classification model, a security alert in the geographical area and determine a patrol route that encompasses a location where the security alert is detected. The application server may be further configured to transmit, to an electronic device of a security operator, a surveillance request to patrol the patrol route for security check based on the detection of the security alert. The application server may be further configured to identify one or more sensors of the plurality of sensors that have a sensing range that covers the location of the security alert. The application server may be further configured to receive second sensor data, in real-time or near real-time, from the identified one or more sensors based on a location of the electronic device being same as the location of the security alert. The application server may be further configured to re-train the classification model based on the second sensor data when a feedback received from the electronic device indicating the security alert to be a false positive.

In some embodiments, the application server may be further configured to select a starting point of the patrol route based on a current location of the electronic device. The application server may select the starting point to be at a minimal distance from the current location of the electronic device.

In some embodiments, the application server may be further configured to transmit keep-alive pings to the plurality of sensors and detect a working status of each sensor of the plurality of sensors based on a response received from each sensor of the plurality of sensors with respect to the transmitted keep-alive pings.

In some embodiments, the application server may be further configured to receive, from the electronic device, third sensor data that indicates at least one of a current location of the electronic device, one or more applications running on the electronic device, and an interaction sequence being performed via a user interface of the electronic device. The application server may be further configured to detect a period of inactivity of the electronic device based on the third sensor data and communicate an alert notification to the electronic device based on the detected period of inactivity being greater than a threshold value.

In some embodiments, the application server may be further configured to collect, from a database, a log of historical security alerts and corresponding surveillance actions that have been executed for handling each of the historical security alerts. The application server may be further configured to create a training dataset comprising the collected historical security alerts and corresponding surveillance actions and train the classification model for security alert detection based on the training dataset. The classification model may learn one or more rules for detection of the security alert.

In some embodiments, the application server may be further configured to re-train the classification model to at least one of modify the learned rules or learn one or more new rules. The classification model may be re-trained based on the feedback received from the electronic device. The classification model is a deep learning model.

In some embodiments, the electronic device may be communicatively coupled to one or more electronic devices of one or more other security operators in the geographical area to form an interconnected security network.

In some embodiments, the surveillance request may further include at least one of a task to be performed at the location, a historical log of security alerts associated with the location, and a severity of the surveillance request.

In some embodiments, the second sensor data may further include information associated with the task being performed at the location by the security operator.

The methods and systems of the disclosure provide a solution for implementing integrated security management systems and methods within the geographical area (interchangeably referred to as "the target area"). The methods and systems allow for real-time monitoring and safeguarding of the target area. The disclosed methods further enable prevention of an undesirable event by initiating proactive actions in real-time. The integrated security management system disclosed herein provides an end-to-end regulatory platform that is Artificial Intelligence (AI)-assisted and learns based on feedback and statuses provided by users and security operators. Further, the disclosed methods and systems provide a comprehensive solution for providing foolproof security based on a context associated with one or more on-going events in the target area being monitored by the integrated security management system. The disclosed methods and systems solve a technical problem of suboptimal detection of security threats and attacks due to human errors and technical insufficiency in timely processing of sensor data associated with the target area. The disclosed methods and systems leverage active machine learning to ensure continuous improvement in detection of security threats and attacks in the target area. Exemplary implementations of the integrated security management system may include, but are not limited to, monitoring execution of industrial processes, security of sensitive areas, monitoring dynamically changing areas, such as an auditorium, a playground, or the like.

FIG. 1 is a block diagram that illustrates a system environment of an integrated security management system, in accordance with an exemplary embodiment of the disclosure. Referring to FIG. 1, a system environment 100 is shown to include a target area 102, an application server 104, a database 105, a user device 106, a first operator device 108a, a second operator device 108b, and a communication network 110. The first and second operator devices 108a and 108b are collectively referred to and designated as 'the plurality of operator devices 108'. The target area 102 may be deployed with a plurality of sensors such as a proximity sensor 112, an imaging device 114, a motion sensor 116, a photosensor 118, an audio sensor 120, a temperature sensor 122, and a smoke sensor 124. The application server 104, the user device 106, the plurality of operator devices 108, and the plurality of sensors collectively form the integrated security management system.

The communication network 110 is a medium through which instructions and messages are transmitted between the application server 104, at least one of the user device 106, the plurality of operator devices 108, and the plurality of sensors. Examples of the communication network 110 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Examples of the communication network 110 may further include a Narrow Band-Internet of Things (NB-IoT) network, a 5G network, a 4G network, a long range (LoRa) wireless technology network, a ZigBee network, an IPv6 Low-power wireless Personal Area Network (6LowPAN), or the like. Various entities (such as the application server 104, the database 105, the user device 106, the plurality of operator devices 108, and the plurality of sensors) in the system environment 100 may be coupled to the communication network 110 in accordance with various wired and wireless communication protocols, such as Transmission Control Protocol and Internet Protocol (TCP/IP), User Datagram Protocol (UDP), Long Term Evolution (LTE) communication protocols, or any combination thereof.

The target area 102 may refer to a geographical area or region, a building, a campus, or the like that requires to be monitored to prevent occurrence of undesirable events such as violation of regulations, an act of criminal offense, an accident, a medical emergency, or the like. The target area 102 may be an area within a closed boundary or an open boundary. Examples of the target area 102 may include a swimming pool, a residential complex, a hospital, a park, a zoo, a city, a school, a college, a bank, a warehouse, a manufacturing plant, or the like. The target area 102 may have one or more users (for example, a user 111) and a plurality of operators 109 (for example, a first operator 109a and a second operator 109*b*) associated therewith. The term "operator" is used interchangeably with the term "security operator" throughout the ongoing description.

The target area 102 may be deployed with the plurality of sensors at one or more locations within the target area 102. Each sensor of the plurality of sensors may have a sensing range that covers a portion of the target area 102, for example, a coverage area of the sensor. The sensing range of the plurality of sensors, collectively, covers the target area 102. In other words, the plurality of sensors is deployed in the target area 102 in such a manner that the coverage areas of the plurality of sensors collectively cover the target area 102 in entirety. Each sensor (operating separately or in conjunction with one or more other sensors) of the plurality of sensors may be configured to detect one or more irregularities or anomalies, that indicate an occurrence of an undesirable event, in the target area 102. The irregularities or anomalies may correspond to a security alert and may have occurred at a location within the target area 102.

The plurality of sensors may include the proximity sensor 112, the imaging device 114, the motion sensor 116, the photosensor 118, the audio sensor 120, the temperature sensor 122, and the smoke sensor 124. The target area 102 may further include an audio speaker 126, and a network infrastructure 128. In an embodiment, the plurality of sensors may communicate corresponding sensor data to the application server 104 via the network infrastructure 128. In another embodiment, the plurality of sensors may be configured to communicate the corresponding sensor data to the application server 104 via a dedicated communication circuitry included therein. The plurality of sensors may communicate with each other via a dedicated communication channel 130, for example, wired or wireless communication channel.

In an embodiment, the plurality of sensors may be artificial intelligence (AI) assisted, for example, Internet of Things (IoT) sensors. The plurality of sensors may be further configured to store one or more rules for detection of anomalies within the target area 102. The plurality of sensors may be further configured to analyze corresponding sensor data to identify whether any of the rules are being violated. Each sensor may detect any rule violation as a security alert, and communicate corresponding sensor data to the application server 104 to report the security alert.

The proximity sensor 112 may refer to an electronic device including one or more electronic components, logic, or circuitry configured to detect the presence of one or more objects or individuals in its proximity, for example, within a first threshold distance or within the sensing range. In an embodiment, the proximity sensor 112 may detect an intrusion within a restricted region. For example, the proximity sensor 112 may be deployed near a swimming pool in the target area 102 such that the proximity sensor 112 detects an intrusion at the swimming pool when there is no lifeguard on duty or when the swimming pool has been closed for public access.

The imaging device 114 may refer to an electronic device including one or more electronic components, logic, or circuitry configured to capture a plurality of images or videos of an environment that is within a field of vision, for example, the sensing range, of the imaging device 114. The imaging device 114 may further include processing circuitry that may be configured to process and analyze the plurality of images and videos being captured in real-time or near real-time to detect a security alert within the target area 102. In an embodiment, the imaging device 114 may be configured to apply one or more image processing techniques and/or object detection techniques to analyze the captured images and videos. In an embodiment, the imaging device 114 may be an AI-assisted camera. The imaging device 114 may be configured to apply one or more edge detection techniques to analyze and process the captured images and videos for detecting anomalies.

The motion sensor 116 may refer to an electronic device including one or more electronic components, logic, or circuitry configured to detect a state of motion and/or velocity of an object or person present in its vicinity, for example, within a second threshold distance or within the sensing range. The photosensor 118 may refer to an electronic device including one or more electronic components, logic, or circuitry configured to detect presence of light in its vicinity, for example, the sensing range. The audio sensor 120 (for example, a microphone) may refer to an electronic device including one or more electronic components, logic, or circuitry configured to detect and/or record sound/audio signals (for example, noise) present in its vicinity, for example, the sensing range. The temperature sensor 122 may refer to an electronic device including one or more electronic components, logic, or circuitry configured to detect a magnitude of temperature within its vicinity, for example, the sensing range. The smoke sensor 124 may refer to an electronic device including one or more electronic components, logic, or circuitry configured to detect a presence of smoke within its vicinity, for example, the sensing range.

In an embodiment, upon detecting an anomaly, each sensor of the plurality of sensors may be configured to generate instant (or real time) alerts in form of visual signals or audio signals. Each sensor may include circuitry for generating the visual signal. In an example, the visual signal may be generated by way of a light emitting diode (LED). Each sensor may be further configured to communicate with the audio speaker 126 for generating the audio signal. In another embodiment, each sensor may be AI-enabled and may communicate with another sensor to verify the detected anomaly. For example, the temperature sensor 122, upon detecting an abrupt increase in temperature, may communicate with the smoke sensor 124 to verify whether there is a fire within the target area 102. In such a scenario, the temperature sensor 122 and the smoke sensor 124 may be deployed in the target area 102 such that they have overlapping sensing range. Upon detection of the anomaly, first sensor data may be communicated by the plurality of sensors to the application server 104. Based on the first sensor data, the application server 104 may be configured to detect a security alert.

The audio speaker 126 may refer to an electronic device including one or more electronic components, logic, or circuitry configured to generate audio/sound signals to make an announcement or issue an alert. The audio speaker 126 may be controlled by at least one of the application server 104 and the plurality of operator devices 108.

The network infrastructure 128 may include suitable logic, circuitry, interfaces, and/or code, executable by the circuitry, for facilitating communication using one or more communication protocols. For example, the network infrastructure 128 may facilitate communication between the plurality of sensors and the application server 104. Examples of the network infrastructure 128 may include, but are not limited to, an antenna, a radio frequency transceiver, a wireless transceiver, a Bluetooth transceiver, an ethernet-based transceiver, a universal serial bus (USB) transceiver, or any other device configured to transmit and receive data.

It will be apparent to a person skilled in the art that the target area 102 shown in FIG. 1 is exemplary. In other embodiments, the target area 102 may include additional or different components. Further, for the sake of brevity, one instance of each of the plurality of sensors is shown in FIG. 1. However, in an actual implementation, the target area 102 may be deployed with multiple proximity sensors, imaging devices, motion sensors, photosensors, audio sensors, temperature sensors, and smoke sensors with overlapping sensing ranges to ensure full coverage of the target area 102. In an embodiment, the plurality of sensors may be mounted on a mechanical arrangement that is controlled by the application server 104. For example, in case of the imaging device 114, the mechanical arrangement may be a camera rig controlled by the application server 104 to change a field of view or the sensing range of the imaging device 114. Similarly, other sensors may also be mounted on such mechanical arrangement controlling which the application server 104 may change sensor's sensing range.

The database 105 may include suitable logic, circuitry, interfaces, and/or code, executable by the circuitry, that may be configured to perform one or more operations for storing data associated with at least one of the target area 102, the plurality of operators 109, a user 111 of the integrated security management system, data associated with one or more historical security alerts that have occurred in the past, one or more surveillance actions taken in the past for handling the historical security alerts, a patrol route of each of the plurality of operators 109, or the like. In an embodiment, the database 105 may store a profile of each of the plurality of operators 109, patrol route preference data associated with each of the plurality of operators 109, a profile associated with the user 111, and specific security needs of the user 111, or the like. In an embodiment, the plurality of sensors may communicate corresponding sensor data to the database 105. The database 105 may store the sensor data received from the plurality of sensors for a defined time period. The database 105 may be accessed by the user device 106 and the plurality of operator devices 108 to access (for example, download) an executable file for a service application of the integrated security management system stored therein. Examples of the database 105 may include a cloud-based database, a local database, a distributed database, a database management system (DBMS), or the like. Although the database 105 is described herein as a standalone entity, in other embodiments, the database 105 may be integrated with the application server 104 without deviating from the scope of the disclosure.

The user device 106 may include suitable logic, circuitry, interfaces, and/or code, executable by the circuitry, configured to implement a service application in a first mode, e.g., user mode. Hereinafter, the service application operating in the first mode is referred to as "user application". The user device 106 may be associated with a corresponding user (for example, the user 111). The user device 106 may be used by the corresponding user 111 for accessing the service application. Examples of the user device 106 may include, but are not limited to a cellphone, a smartphone, a tablet, a phablet, a laptop, a smartwatch, and a computer. Various features of the service application implemented on the user device 106 are described in detail in conjunction with FIG. 3A.

An electronic device possessed by an operator (i.e., a security operator) is referred to as an operator device. Each of the plurality of operator devices 108 may include suitable logic, circuitry, interfaces, and/or code, executable by the circuitry, configured to implement the service application in a second mode, i.e., operator mode. Hereinafter, the service application operating in the second mode is referred to as "operator application". The first operator device 108a may be associated with, for example, in possession of, the first operator 109a and the second operator device 108b may be associated with, for example, in possession of, the second operator 109b.

An operator may be a security guard, a supervisor, an invigilator, or the like. In an embodiment, the operator may be a robotic operator being controlled by the application server 104. The robotic operator may be AI-enabled and may be configured to provide real-time status and feedback to the application server 104 using a corresponding operator device. In an embodiment, the plurality of operator devices 108 may be shared among the plurality of operators 109. Each of the plurality of operator devices 108 may be configured to communicate real-time location data thereof to the application server 104. Each of the plurality of operator devices 108 may be used by the corresponding operator of the plurality of operators 109 for accessing the operator application. Examples of the plurality of operator devices 108 may include, but are not limited to, a cellphone, a tablet, a phablet, a laptop, a smartwatch, a smartphone, or any wearable smart device. The plurality of operator devices 108 may be configured to receive real-time instructions from at least one of the user device 106, the application server 104, an authority, or the like. The plurality of operator devices 108 may be further configured to receive, from the application server 104, current patrol routes and workflows assigned to the corresponding operators 109 for patrolling the target area 102. The plurality of operator devices 108 may be interconnected to form an interconnected security network that may be utilized by the operator devices 108 to communicate among themselves. In some embodiments, the interconnected security network may be facilitated by the communication network 110. In some embodiments, the interconnected security network may be separate from the communication network 110 and may act as an exclusive communication channel to the plurality of operator devices 108. Each operator device 108 may be used by the corresponding operator 109 to request help from a nearby operator or the user. The plurality of operator devices 108 may be further configured to communicate statuses and feedback received from the corresponding operators 109 to the application server 104. For the sake of brevity, FIG. 1 is shown to include two operator devices and one user device. However, in an actual implementation, the system environment 100 may include any number of operator devices and user devices without limiting the scope of the disclosure.

The application server 104 may include suitable logic, circuitry, interfaces, and/or code, executable by the circuitry, to implement the integrated security management system within the target area 102. Examples of the application server 104 may include, but are not limited to, personal computers, laptops, mini-computers, mainframe computers, any non-transient and tangible machine that can execute a machine-readable code, cloud-based servers, distributed server networks, or a network of computer systems. The application server 104 may be realized through various web-based technologies such as, but not limited to, a Java web-framework, a .NET framework, a personal home page (PHP) framework, NodeJS framework, Go Framework, or any other web-application framework.

The application server 104 may be configured to communicate with the plurality of sensors, the user device 106, and the plurality of operator devices 108 via the communication network 110. The application server 104 may be configured to receive sensor data (e.g., live video feed, audio feed, temperature readings, motion sensor data, proximity sensor data, or the like) from the plurality of sensors via the communication network 110. The application server 104, based on the received sensor data (for example, first sensor data and second sensor data), may be configured to execute one or more operations to implement the proactive security management within the target area 102.

The application server 104 may be configured to analyze the received first sensor data to verify an occurrence of an anomaly within the target area 102. The term "anomaly" refers to one or more undesirable incidents within the target area 102 that may require attention of one or more of the plurality of operators 109. The anomaly may be associated with an accident, an unwanted situation, an intrusion, an unlawful activity, or the like. The anomaly may be detected based on the first sensor data and may lead to detection of a security alert by the application server 104. That is to say, security alert may be detected based on presence of the anomaly within the target area 102. Hereinafter, the term anomaly and security alert are used interchangeably throughout the ongoing description.

The application server 104 may be configured to perform a holistic analysis of the first sensor data by critically verifying sensor data received from each sensor with sensor data received from other sensors. In one embodiment, the application server 104 may analyze the received first sensor data based on security alert data associated with various anomalies detected and handled in the past. For example, the application server 104 may be configured to store a security alert resolution dataset including details of a plurality of probable anomalies and corresponding security alert handling actions. Based on the analysis of the received first sensor data and the security alert resolution dataset that includes rules for detecting, verifying, and handling various anomalies, the application server 104 may detect whether the first sensor data indicates an occurrence of any of the probable anomalies. The application server 104 may be configured to initiate a security alert handling action included in the security alert resolution dataset corresponding to the detected security alert. The application server 104 may be further configured to determine a threat level (for example, severity) of the detected security alert and communicate security alert and information to one or more of the plurality of operator devices 108 and/or the user device 106. The application server 104 may be further configured to communicate a distress message to a relevant authority, for example, police, a local authority, or the like based on the detected security alert and the determined threat level. The application server 104 may be further configured to receive feedback and statuses from the plurality of operator devices 108 and/or the user device 106 on the reported security alert. The application server 104 may be configured to learn a validity of the security alert, for example, whether the security alert actually occurred or was the security alert a false positive, based on the received feedback and status. In an embodiment, the application server 104 may be configured to update the security alert resolution dataset based on the feedback and status received from the plurality of operator devices 108 and/or the user device 106. Hence, an accuracy of security alert detection and handling by the application server 104 is iteratively improved based on the received feedbacks and statuses.

The application server 104 may be configured to host and control the service application being executed on the user device 106 and the plurality of operator devices 108. The application server 104 may control the service application to assist the user 111 and the plurality of operators 109 (inter-changeably referred to as "the operators 109") in implementing a proactive security approach. The application server 104 may be further configured to receive one or more inputs from the user device 106 and/or the plurality of operator devices 108 to report anomalies. Based on the received inputs, the application server 104 may update the security alert resolution dataset to include details of the reported security alert and a corresponding security alert handling action performed for handling the reported security alert. The concept of receiving the input is described in detail with FIGS. 3A and 3B.

The application server 104 may be further configured to track the plurality of operator devices 108 based on the real-time location data received from the plurality of operator devices 108. The application server 104 may track the plurality of operator devices 108 to monitor the activities of the operators 109. The application server 104 may be further configured to generate patrol routes for the operators 109 to monitor the target area 102. The application server 104 may dynamically update the patrol routes of the operators 109 based on one or more considerations that are explained in detail in conjunction with FIG. 2.

In an embodiment, the application server 104 may be further configured to store a digital map (e.g., a 2-dimensional or 3-dimensional map) of the target area 102. The application server 104 may be further configured to rate (or score) different regions within the target area 102 based on corresponding security requirements. The application server 104 may be configured to update the ratings (or score) of corresponding regions based on the feedback and status received from the user device 106 and the plurality of operator devices 108.

As shown in FIG. 1, the application server 104 may include a tracking engine 132, a context engine 134, a service engine 136, and a trained classification model 138. The application server 104 and its components are described in detail in conjunction with FIG. 2.

In some embodiments, the application server 104 may store therein, the security alert resolution dataset that may be updated by the application server 104 or customizable by the user 111 or a supervisor. In an embodiment, a local version of security alert detection rules may be stored in the plurality of sensors by the application server 104. Each sensor may sense corresponding parameters in the target area 102 and detect one or more security alerts based on the security alert detection rules stored therein. Each sensor may communicate the detected security alert and/or corresponding sensor data (i.e., the first sensor data) to the application server 104. The application server 104 may verify the detected security alert based on the received first sensor data and the security alert resolution dataset. In one example, upon verification of the received sensor data, the application server 104 may determine that the detected security alert is a false positive. In such a scenario, the application server 104 may instruct the plurality of sensors to discard the detected security alert. In another example, upon verification of the received first sensor data, the application server 104 may determine that the detected security alert is authentic, the application server 104 may initiate a surveillance action for resolution of the detected security alert.

The application server 104 may be configured to alert an operator (e.g., any of the first and second operators 109a and 109b) that is nearest to a location of the detected security alert or a concerned operator (e.g., any of the first and second operators 109a and 109b) regarding the detected security alert. For example, the application server 104 may communicate an alert signal and security alert information including a location, a type, and a severity level of the security alert to the first operator device 108a of the nearest operator 109a. The application server 104 may further communicate one or more instructions for security alert inspection and handling to the first operator device 108a. The application server 104 may receive feedback and a status from the user device 106 and/or the first operator device 108a regarding the security alert. In an embodiment, the received feedback may indicate that the security alert was handled in time due to the timely security alert. In another embodiment, the received feedback may indicate that the security alert was a false positive. In such a scenario, the application server 104 may update the security alert resolution dataset and the security alert detection rules to modify the details of the detected security alert. Thus, the application server 104 performs a rule-based detection and handling of the security alert.

In operation, the application server 104 may receive the first sensor data from the plurality of sensors. The first sensor data may be received in real-time or near real-time. The first sensor data may refer to sensor data of the plurality of sensors that may be communicated to the application server 104 continuously, periodically, or based on occurrence of an anomaly. The application server 104 may be further configured to provide the first sensor data to the trained classification model 138 as an input. The application server 104 may be further configured to detect, based on an output of the trained classification model 138, the security alert in the target area 102. The application server 104 may detect the security alert when the first sensor data corresponds to at least one rule for security alert detection that has been learnt by the trained classification model 138. The application server 104 may be further configured to determine a patrol route that encompasses a location in the target area 102 where the security alert has been detected. The patrol route may correspond to a path that an operator (e.g., the first and second operators 109a and 109b) has to follow in the target area 102 to reach the location of the security alert. The application server 104 may determine the patrol route based on a current location of the first operator device 108a that is associated with the first operator 109a assigned to patrol the location of the security alert.

The application server 104 may be further configured to transmit, to the first operator device 108a, a surveillance request to patrol the patrol route for security check based on the detection of the security alert. The surveillance request may include the location of the security alert, a task to be performed at the location, the historical log of security alerts associated with the location, and a severity of the surveillance request. The task to be performed at the location may be aimed at resolving the anomaly and corresponding security alert.

The application server 104 may be further configured to identify one or more sensors of the plurality of sensors that have a sensing range that covers the location of the security alert. A sensing range of a sensor corresponds to a portion of the target area 102 that is monitored by the sensor. The application server 104 may be further configured to receive the second sensor data, in real-time or near real-time, from the identified one or more sensors based on a location of the operator device 108a being same as the location of the security alert. The second sensor data includes information associated with the task or one or more other activities being performed at the location by the security operator 109a. For example, the second sensor data may include a live video feed of the location, an audio recording of the location, or the like while the task or one or more other activities were being performed at the location by the security operator 109a. The application server 104 may be further configured to receive feedback from the electronic device (for example, the operator device 108a) indicating whether the security alert is resolved, whether the security alert was a false positive, or whether additional support is required to resolve the security alert. The application server 104 may be further configured to re-train the classification model based on the second sensor data when the received feedback indicates the security alert to be a false positive.

For the sake of brevity, the ongoing description is described with respect to the first operator device 108a. However, in other embodiments, the system may operate in similar manner with one or more other operator devices (for example, the second operator device 108b).

Figure 2:
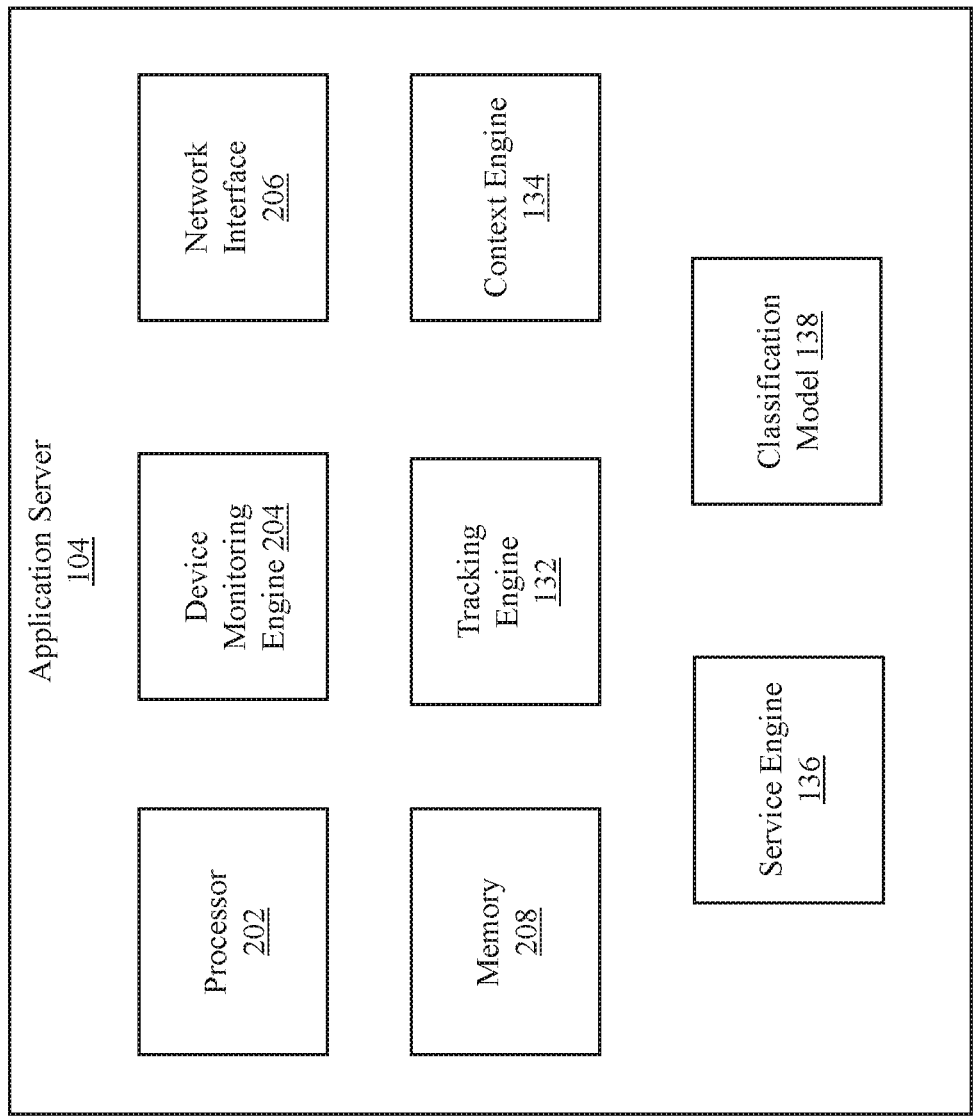
FIG. 2 is a block diagram that illustrates an application server, in accordance with an exemplary embodiment of the disclosure.

FIG. 2 is a block diagram that illustrates the application server, in accordance with an exemplary embodiment of the disclosure. Referring to FIG. 2, the application server 104 is shown to include a processor 202, a device monitoring engine 204, a network interface 206, and a memory 208. The application server 104 may further include the tracking engine 132, the context engine 134, the service engine 136, and the classification model 138.

The processor 202 may include suitable logic, circuitry, interfaces, and/or code, executable by the circuitry, configured to process the sensor data received from the plurality of sensors. The processor 202 may be configured to analyze the sensor data corresponding to audio, video, images, temperature, precipitation, humidity, or any other parameter associated with the target area 102. The processor 202 may determine or verify the presence of the security alert within the target area 102 based on the processing of the sensor data. The processor 202 may be configured to apply one or more image processing techniques, one or more face or object recognition techniques, or the like for determining or verifying the security alert present within the target area 102. In an embodiment, the processor 202 may be configured to apply one or more signal optimization techniques, signal normalization techniques, image segmentation techniques, noise filtration techniques, or the like for optimizing the received sensor data. The processor 202 may be implemented by one or more processors, such as, but not limited to, an application-specific integrated circuit (ASIC) processor, a reduced instruction set computing (RISC) processor, a complex instruction set computing (CISC) processor, and a field-programmable gate array (FPGA) processor. The one or more processors may also correspond to central processing units (CPUs), graphics processing units (GPUs), network processing units (NPUs), digital signal processors (DSPs), image processors, or the like. It will be apparent to a person of ordinary skill in the art that the processor 202 may be compatible with multiple operating systems. The processor 202 may be configured to communicate the processed sensor data to the tracking engine 132 for detection or verification of the security alert.

The device monitoring engine 204 may include suitable logic, circuitry, interfaces, and/or code, executable by the circuitry, configured to communicate keep-alive pings to each sensor of the plurality of sensors. In an embodiment, the device monitoring engine 204 may communicate the keep-alive pings to each sensor of the plurality of sensors at random time intervals. In another embodiment, the device monitoring engine 204 may communicate the keep-alive pings to each sensor of the plurality of sensors at periodic time intervals. In another embodiment, the device monitoring engine 204 may communicate a keep-alive ping to a sensor of the plurality of sensors based on a period of inactivity of the sensor being greater than a threshold inactivity period. For example, if a sensor of the plurality of sensors has been inactive, e.g., no sensor data is received from the sensor, for more than the threshold inactivity period, the device monitoring engine 204 may communicate a keep-alive ping to the sensor. A keep-alive ping may be a keep-alive data packet requesting some specific information, for example, current Internet Protocol (IP) address, identification number, or the like, from a target receiving device. The device monitoring engine 204 may transmit keep-alive pings to the plurality of sensors to ensure that all the sensors are up and running. The device monitoring engine 204 may further detect a working status of each sensor of the plurality of sensors based on reception of a response received from each sensor of the plurality of sensors to the keep-alive pings. Upon receiving the response from a sensor, the application server 104 may be configured to determine that the sensor is active and operational. In an embodiment, when the application server 104 does not receive the response from the sensor within a specified time interval, the application server 104 may be configured to communicate a notification indicating a requirement of maintenance of the sensor to at least one of the user device 106, the operator devices 108, an authority, or the like.

The network interface 206 may include suitable logic, circuitry, interfaces, and/or code, executable by the circuitry, configured to facilitate communication using one or more communication protocols. For example, the network interface 206 may facilitate communication among the application server 104, the plurality of sensors, the user device 106, and the operator devices 108. Examples of the network interface 206 may include, but are not limited to, an antenna, a radio frequency transceiver, a wireless transceiver, a Bluetooth transceiver, an ethernet based transceiver, a universal serial bus (USB) transceiver, or any other device configured to transmit and receive data.

The memory 208 may include suitable logic, circuitry, interfaces, and/or code, executed by the circuitry, configured to store information associated with the target area 102, the plurality of operators 109, the user 111 of the integrated security management system, one or more details of probable anomalies, various actions required to handle the anomalies, the patrol routes of each operator 109, or the like. The memory 208 may be further configured to store the digital map of the target area 102, the patrol routes of the operators 109, and the workflows of the operators 109. The memory 208 may be further configured to store the security alert handling dataset including the security alert detection rules for security alert detection and handling. The security alert detection may refer to one or more conditions or constraints that are to be followed for detection, verification, or handling of the anomalies. The security alert detection rules may be formulated and updated based on learning of the classification model 138.

In an example, a first rule may state that a child swimming in a swimming pool of the target area 102 without the supervision of a lifeguard or an adult is a security alert. Similarly, a second rule may indicate a requirement for face recognition of the child swimming in the swimming pool.

The workflows stored in the memory 208 may indicate a sequence of actions to be performed by the application server 104 for detecting or verifying a security alert. In an embodiment, the workflow may further include a sequence of actions to be performed by an operator or a user for resolving a detected security alert.

Examples of the memory 208 include, but are not limited to, a random-access memory (RAM), a read-only memory (ROM), a removable storage drive, a hard disk drive (HDD), a flash memory, a solid-state memory, and the like. In one embodiment, the memory 208 may be realized through various database technologies such as, but not limited to, Microsoft® SQL, Oracle®, IBM DB2®, Microsoft Access®, PostgreSQL®, MySQL®, and SQLite®. It will be apparent to a person skilled in the art that the scope of the disclosure is not limited to realizing the memory 208 in the application server 104, as described herein. In other embodiments, the memory 208 may be realized in form of an external database 105 or a cloud storage working in conjunction with the application server 104, without departing from the scope of the disclosure.

The tracking engine 132 may include suitable logic, circuitry, interfaces, and/or code, executable by the circuitry, configured to track movement and real-time locations of the plurality of operators 109. The tracking engine 132 may track each operator 109 by way of corresponding operator devices 108. In one example, each operator 109 may have a specialized device (e.g., the first operator device 108a) configured to communicate a live location of a corresponding operator (e.g., the first operator 109a) to the tracking engine 132. The tracking engine 132 may be further configured to generate and update patrol routes for the operators 109. The tracking engine 132 may be further configured to determine whether the first operator 109a has deviated from an assigned patrol route based on the real-time location received from the first operator device 108a. The tracking engine 132 may be further configured to check an alertness level of the first operator 109a. The tracking engine 132 may be further configured to perform geofencing within the target area 102.

In an embodiment, the tracking engine 132 may determine the patrol routes to be followed by the operators 109 for monitoring the target area 102 as well as for performing a security check at the location of the security alert. The patrol route of each operator 109 may refer to a path and a distance to be followed by each operator 109 for performing surveillance at the location of the security alert. In an embodiment, the tracking engine 132 may be configured to update the patrol routes dynamically based on the security requirements of different regions within the target area 102. In one example, the tracking engine 132 may observe that a first location within the target area 102 may have had multiple instances of intrusions in the recent past. Therefore, the tracking engine 132 may update patrol routes of one or more operators 109a or 109b to increase a frequency of patrolling in the first location. For the sake of brevity, the first and second operators 109a and 109b are referred to as the one or more operators. In another example, the tracking engine 132 may observe that the first location within the target area 102 may have had multiple instances of intrusions between 2 PM-5 PM on weekdays. In such a scenario, the tracking engine 132 may update patrol routes of one or more operators 109a or 109b to increase a frequency of patrolling in the first location between 2 PM-5 PM. In another embodiment, the tracking engine 132 may be configured to dynamically update the patrol route of the first operator 109a based on a request for route update received from the first operator device 108a.

In another embodiment, the tracking engine 132 may be configured to dynamically update the patrol routes of one or more operators 109a or 109b based on a security request received from the user 111. The security request may have been communicated using the user device 106 to increase the security of a specific location within the target area 102. In an embodiment, the tracking engine 132 may dynamically update the patrol route of the operators 109 after a first time-interval. Examples of the first time-interval may include one day, two days, three days, a week, a month, two months, or the like. In an embodiment, the first time-interval may be defined or could be defined dynamically by a security manager of the target area 102. In an embodiment, the tracking engine 132 may dynamically update the patrol route of each operator 109 based on their performance associated with their current route of patrolling. In one example, the first operator 109a may be deployed at a parking area within a housing society. The tracking engine 132 may observe via a motion sensor of the first operator device 108a that the first operator 109a remains idle during corresponding patrolling time period. Therefore, the tracking engine 132 may be configured to dynamically update the patrol route for the first operator 109a such that the updated patrol route may require the first operator 109a to patrol within a relatively crowded area. Therefore, the first operator 109a may be required to stay active while patrolling.

In an embodiment, the tracking engine 132 may be configured to determine the alertness level of each operator 109 based on sensor data received from one or more sensors of corresponding operator devices 108 (for example, the first operator device 108a). The tracking engine 132 may determine the alertness level based on analysis of the sensor data indicative of physical activity of the first operator 109a. For example, a live location feed of the first operator device 108a during patrolling hours of the first operator 109a may indicate that the first operator 109a is not diligent with their duties. In another example, sensor data indicating no or less movement of the first operator device 108a during patrolling hours may indicate that the first operator 109a is sleepy or not awake during the patrolling hours. In another embodiment, the tracking engine 132 may communicate an alert message to the first operator device 108a to seek a response from the first operator 109a. In a scenario, where the tracking engine 132 does not receive the response to the alert message within a specified time period, the tracking engine 132 may deduce that the first operator 109a is not active and may notify a central authority regarding an unresponsive state of the first operator 109a. The central authority may be responsible for maintaining discipline among various operators, e.g., the first operator 109a. In such a scenario, the tracking engine 132 may further communicate the alert message to the second operator 109b (e.g., a second nearest operator after the first operator 109a) based on an unavailability of the first operator 109a. In another embodiment, the tracking engine 132 may be further configured to receive activity information pertaining to one or more activities (e.g., API access, software application access, click rates, or the like) being performed by the operators 109 on their operator devices 108. Based on the received activity information, the tracking engine 132 may be further configured to detect a level of distraction of the operators 109. For example, based on the activity information received from the first operator device 108a, the tracking engine 132 may determine that the first operator device 108a is being used by the first operator 109a to play a digital game, while the first operator 109a is patrolling the assigned patrol route. Consequently, the tracking engine 132 may determine that the level of distraction of the first operator 109a is high and may communicate a warning message to the first operator device 108a to alert the first operator 109a.

In some embodiments, the tracking engine 132 may be configured to receive third sensor data from the operator device 108a. The third sensor data is indicative of at least one of a current location of the operator device 108a, one or more applications running on the operator device 108a, and an interaction sequence being performed via a user interface of the operator device 108a. A lack of change in current location of the operator device 108a for a first time period greater than a threshold value may be indicative of the operator 109a stopping at the current location and not proceeding with corresponding patrol route. In an example, when the one or more applications running on the operator device 108a include the operator application, it may be determined by the tracking engine 132 that the operator 109a is proceeding with their patrol route/workflow. The interaction sequence (e.g., clicks, touches, or the like) being performed via a user interface of the operator device 108a may be indicative of real-time use of the operator device 108a. In an example, the interaction sequence indicative of the operator 109a continuously watching a video streaming application for a second time period that is greater than the threshold value may be indicative of the distracted state of the operator 109a.

The tracking engine 132 may be further configured to detect a period of inactivity based on the third sensor data. The period of inactivity may correspond to a time period for which the current location of the first operator device 108a remains unchanged and a time period for which applications (for example, digital games and e-commerce applications) other than the operator application are accessed on the first operator device 108a. A time period for which the sequence of interaction via the user interface of the first operator device 108a, not including interaction with the operator application, is greater than the threshold value may also be considered as period of inactivity by the tracking engine 132. Examples of the threshold value may include 30 minutes, 1 hour, or the like.

In an embodiment, the tracking engine 132 may be further configured to rate a performance of each operator 109 based on their patrolling performance. Based on the rating, each operator 109 may be incentivized, penalized, or the like. In an embodiment, a patrol route and a geofence of a guarding area of each operator 109 may be determined based on the rating of the corresponding operator 109.

In an embodiment, the tracking engine 132 may be configured to geofence the patrol routes of each operator 109. In another embodiment, the tracking engine 132 may be configured to geofence one or more regions within the target area 102. In another embodiment, the tracking engine 132 may monitor the real-time location of the first operator device 108a to determine whether the first operator 109a is following their dedicated patrol route. For example, when the tracking engine 132 detects that the first operator device 108a has stranded or deviated from a corresponding patrol route, the tracking engine 132 may be configured to communicate a notification (e.g., the alert message) to the first operator device 108a or the authority responsible for disciplining the operators 109.

The context engine 134 may include suitable logic, circuitry, interfaces, and/or code, executable by the circuitry, configured to detect or verify a security alert based on the sensor data. The context engine 134 may be configured to determine the workflows for the operators 109. The context engine 134 may be further configured to communicate dispatch instructions to the operator devices 108 for dispatching the operators 109 to specific locations. The context engine 134 may be configured to receive feedback and statuses from the user device 106 and the operator devices 108. The context engine 134 may detect or verify the security alert based on the rules included in the security alert handling dataset.

In an embodiment, the context engine 134 may analyze the received (and/or processed) first sensor data to determine the threat level or severity of the security alert. In another embodiment, the context engine 134 may further analyze the received (and/or processed) first sensor data in conjunction with one or more feedback received in the past to determine the threat level or severity of the security alert.

For example, the smoke sensor 124 may generate sensor data indicating a presence of smoke within the target area 102 and may detect the security alert based on the generated sensor data. The smoke sensor 124 may communicate the sensor data to the application server 104. Upon receiving the sensor data from the smoke sensor 124, the context engine 134 may be configured to determine the threat level of the security alert. In an instance when a concentration of smoke present in the target area 102 is below a first threshold value, the context engine 134 may determine the threat level to be low. In another instance, when the concentration of the smoke present in the target area 102 is above the second threshold value, the context engine 134 may determine the threat level to be moderate. In another instance, when the concentration of the smoke present in the target area 102 is above a third threshold value, the context engine 134 may determine the threat level to be severe.

In another example, the temperature sensor 122 may detect the security alert due to an abrupt rise in temperature of the target area 102. The temperature sensor 122 may communicate corresponding sensor data to the application server 104. The context engine 134 may be configured to determine the threat level of the security alert based on a magnitude of temperature within the target area 102. For example, if the temperature lies between a range of $T_1$ to $T_2$, the context engine 134 may determine the threat level to be low. If the temperature lies between a range of $T_2$ to $T_3$, the context engine 134 may determine the threat level to be moderate, and if the temperature lies between a range of $T_3$ to $T_4$, the context engine 134 may determine the threat level be severe. In such an example the range $T_1$ to $T_2$ may include temperature magnitudes that are lower than temperature magnitudes included in the range $T_2$ to $T_3$ and the range $T_2$ to $T_3$ may include temperature magnitudes that are lower than temperature magnitudes included in the range $T_3$ to $T_4$.

In an embodiment, similar anomalies having different threat levels may have different security alert handling actions. For example, if the temperature of the target area 102 lies between a range $T_1$ to $T_2$ and the threat level is low, the security alert handling action may include dispatching an operator to a site of the security alert. However, if the temperature lies between a range $T_3$ to $T_4$ and the threat level is severe, the security alert handling action may include contacting a fire department that is nearest to the target area 102.

In an embodiment, the context engine 134 may determine the threat level based on security alert data associated with a security alert detected in the past. For example, the security alert data associated with a past security alert may indicate a trespassing event in the target area 102 followed by theft. Therefore, the context engine 134 may determine a high threat level for any security alert indicating a trespassing event.

The service engine 136 may include suitable logic, circuitry, interfaces, and/or code, executable by the circuitry, to facilitate communication between the application server 104, the user device 106, the operator devices 108, and the plurality of sensors by way of one or more APIs. In an embodiment, the service engine 136 may be configured to communicate alerts, workflows, dynamic patrol routes to the first operator device 108a via the operator application. Similarly, the service engine 136 may be configured to communicate alerts to the user device 106 via the user application.

The classification model 138 may be trained by the application server 104 based on historical security alerts and corresponding surveillance actions. The classification model 138 may be a deep learning model. The classification model 138 may be configured to learn the rules and criteria for the security alert detection from the historical security alerts. The classification model 138 may be further configured to deduce one or more constraints or rules for handling or resolution of various anomalies. The classification model 138 may be further configured to deduce one or more constraints for verification of the anomalies detected by the plurality of sensors. In one example, in the past, a presence of a vehicle on a footpath may have been detected as a security alert by the context engine 134. While handling the security alert, a feedback may have been provided by the first operator 109a via the first operator device 108a that the vehicle on the footpath was a cleaning cart. Subsequently, the feedback may have been received by the application server 104 from the first operator device 108a that the presence of the cleaning cart on the footpath is not a security alert. Therefore, the classification model 138, based on the feedback received from the first operator device 108a, may learn that when a vehicle on the footpath is a cleaning cart, it is not a security alert. Subsequently, the artificial intelligence engine 210 may generate a rule to identify a shape and a type of a vehicle present on the footpath and to detect the presence of the vehicle on the footpath as a security alert only if the vehicle is not identified as a cleaning cart. In another example, an unidentified person entering a residential society may be detected as a security alert due to failed facial recognition. Subsequently, a feedback may have been received by the application server 104 from the first operator device 108a that the unidentified person is a delivery personnel of a courier company, and hence should not be detected as a security alert. Therefore, the classification model 138, based on the feedback received from the first operator device 108a, may learn that an individual wearing a uniform of the courier company with a logo of the courier company is not a security alert. Subsequently, the artificial intelligence engine 210 may generate a rule to identify a color and a logo on the uniform of unidentified persons and to detect the presence of an unidentified person as a security alert only if a context (uniform, logo, etc.) of the unidentified person is new or unrecognized.

It will be apparent to a person of ordinary skill in the art that the abovementioned examples are for illustrative purposes and should not be construed to limit the scope of the disclosure.

For the sake of brevity, the tracking engine 132, the context engine 134, the service engine 136, and the classification model 138 are shown as components of the application server 104. In other embodiments, the tracking engine 132, the context engine 134, the service engine 136, and the classification model 138 may be implemented as separate components communicatively coupled to each other. In another embodiment, the tracking engine 132, the context engine 134, the service engine 136, and the classification model 138 may be implemented using a single component within the application server 104.

It will be apparent to a person skilled in the art that the application server 104 shown in FIG. 2 is exemplary. In other embodiments, the application server 104 may include additional or different components configured to perform similar or different operations.

Figure 3A:
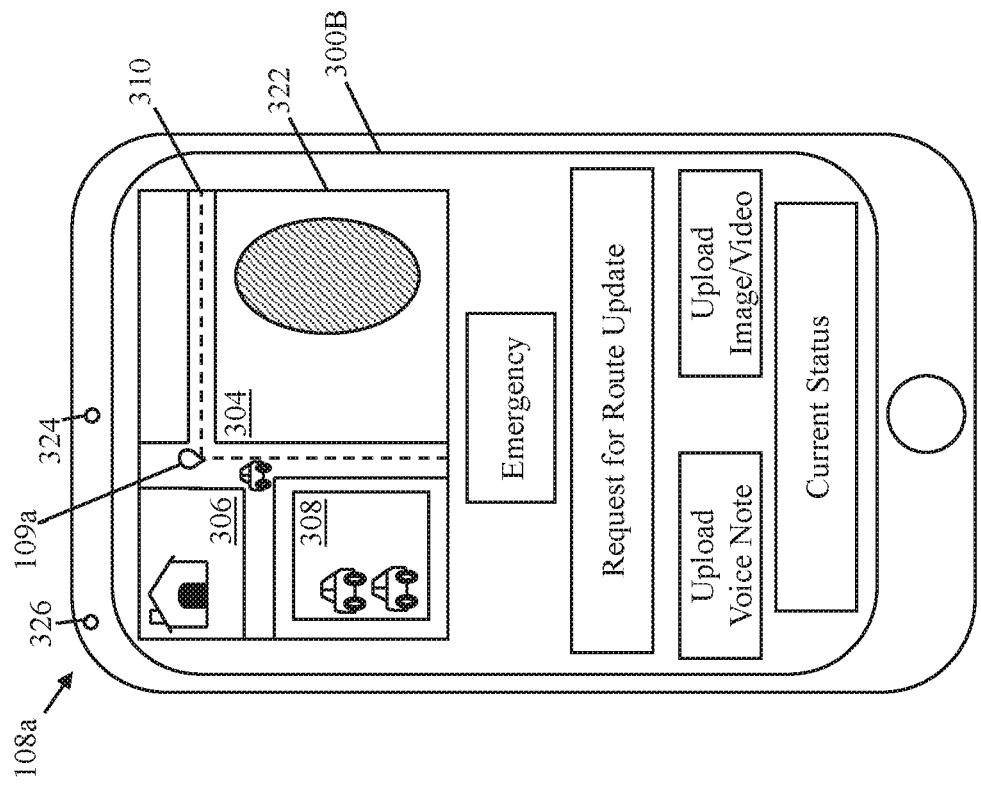
FIG. 3A is a diagram that illustrates a user interface of a user application, in accordance with an exemplary embodiment of the disclosure.

FIG. 3A is a diagram that illustrates a GUI of the user application, in accordance with an exemplary embodiment of the disclosure. Referring to FIG. 3A, a GUI 300A of the service application implemented on the user device 106 is illustrated.

As shown in FIG. 3A, the GUI 300A includes a first digital map 302 of the target area 102. In an example, the target area 102 may be a housing society. Therefore, the first digital map 302 may include a graphical representation (e.g., a 2-dimensional or a 3-dimensional) of the housing society. The first digital map 302 may represent a swimming pool 304, a residential area 306, a parking zone 308, and a driving lane 310. The housing society may further include a plurality of operators (for example, operators 312 and 314) stationed at various locations. Each operator may have an assigned patrol route that they follow to maintain optimal security within the housing society. The first digital map 302 further represents the plurality of operators, for example, operators 312 and 314.

The GUI 300A may further include an "Emergency" option. Upon selection of the "Emergency" option, the GUI 300A may provide various options to the user 111 for contacting at least one of a government authority, a housing society authority, one or more operators 312 and 314, or the like. In one example, the "Emergency" option may be selected by the user 111 living within the residential area 306 upon spotting a malicious person 316 wandering near the residential area 306. Upon the selection of the "Emergency" option, the GUI 300A may present the user 111 with an option to contact an operator who is closest (or nearest) to the residential area 306. As shown, the operator 314 is closest (or nearest) to the residential area 306. Therefore, the GUI 300A presents contact information of the operator 314 to the user 111 via the user device 106. In an embodiment, the details of the security alert and a real-time location of the user device 106 is communicated to the application server 104 or an operator device of the operator 314, upon selection of the "Emergency" option. The application server 104 may be configured to communicate a notification to the closest (or nearest) operator to reach a site of the security alert based on the selection of the "Emergency" option.

The GUI 300A may further present an additional option "Request for guard" to the user 111. Selection for the "Request for guard" option may initiate a request for assigning an operator to accompany the user 111 to a specific location. In one example, the user 111 may request for the operator to accompany them for a trip within or outside the residential area 306 (e.g., the target area 102). Based on such a request from the user device 106, the application server 104 may be configured to update a workflow of an operator who is to be assigned to accompany the user 111. For example, a current workflow of the operator 314 may include maintain a record for all passersby that enter or leave an entry gate of the housing society. The application server 104 may update the current workflow of the operator 314 to assign the operator 314 for accompanying the user 111.

The GUI 300A may further present an option "Upload Voice Note" to the user 111. The "Upload Voice Note" option may be used by the user 111 to upload an audio file that may describe the security alert, a current condition at the site of the security alert, a cause of the security alert, or the like. The user application may use a voice recorder 318 of the user device 106 for recording the voice note.

The GUI 300A may further present an option "Upload Image/Video" to the user 111. The "Upload Image/Video" option may be used by the user 111 to capture and communicate one or more images or videos of at least one of the site of the security alert, the cause of the security alert, a measure taken by the user 111 to handle the security alert, a measure taken by an operator on the site to handle the security alert, or the like. The user application may use a camera 320 of the user device 106 for capturing the images and/or videos.

The GUI 300A may further include an option "Feedback" for acquiring a feedback from the user 111 of the user device 106. The feedback may be acquired in form of a textual input, an audio input, a graphical input, or a symbolic input provided by the user 111 via the user device 106. The application server 104 may use the feedback acquired from the user 111 to improve proactiveness of the security system.

In an embodiment, when the user 111 enters a high-risk area within the target area 102, the GUI 300A may present a notification informing the user 111 that they have entered a high-risk area. In another embodiment, when the user 111 enters an area within the target area 102 that is not being monitored by the security system, the GUI 300A may present another notification informing the user 111 that they have entered an insecure area. Such notifications may be communicated by the application server 104 to the user device 106 based on real-time location information received by the application server 104 from the user device 106.

It will be apparent to a person skilled in the art that the GUI 300A disclosed herein is exemplary. In other embodiments, the GUI 300A of the user device 106 may be different and may include additional or different components. The GUI 300A is shown to be digital however in other embodiments, the GUI 300A may be represented via at least one of an augmented reality (AR) interface, a virtual reality (VR) interface, and a mixed reality (MR) interface.

Figure 3B:
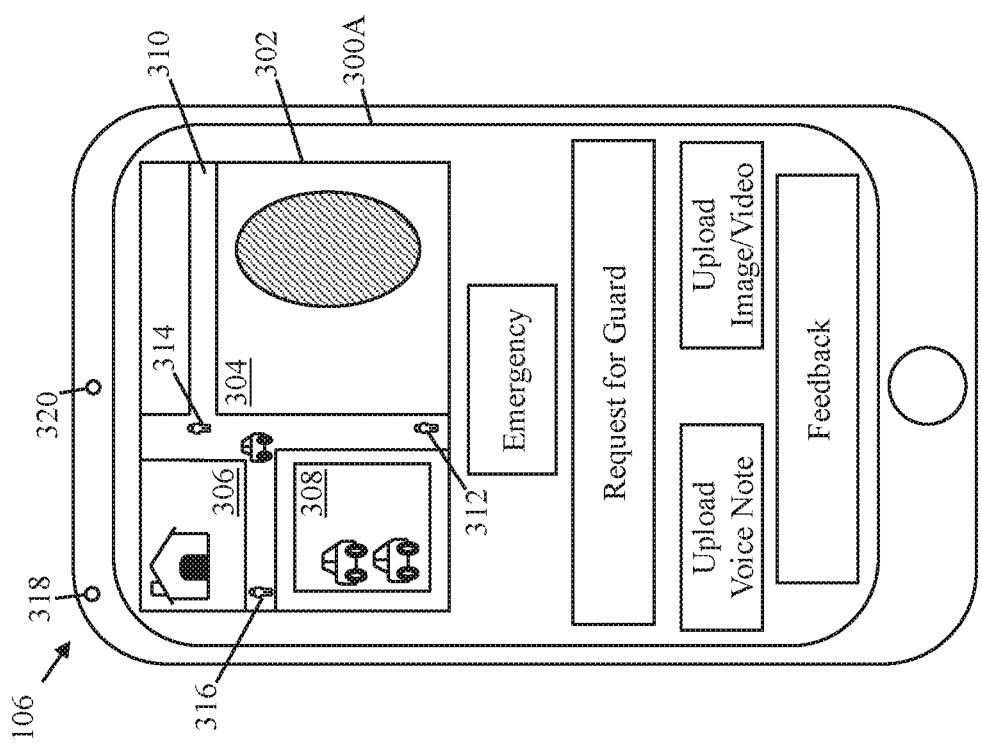
FIGS. 3B and 3C are diagrams that, collectively, illustrate a user interface of an operator application, in accordance with an exemplary embodiment of the disclosure.
Figure 3C:
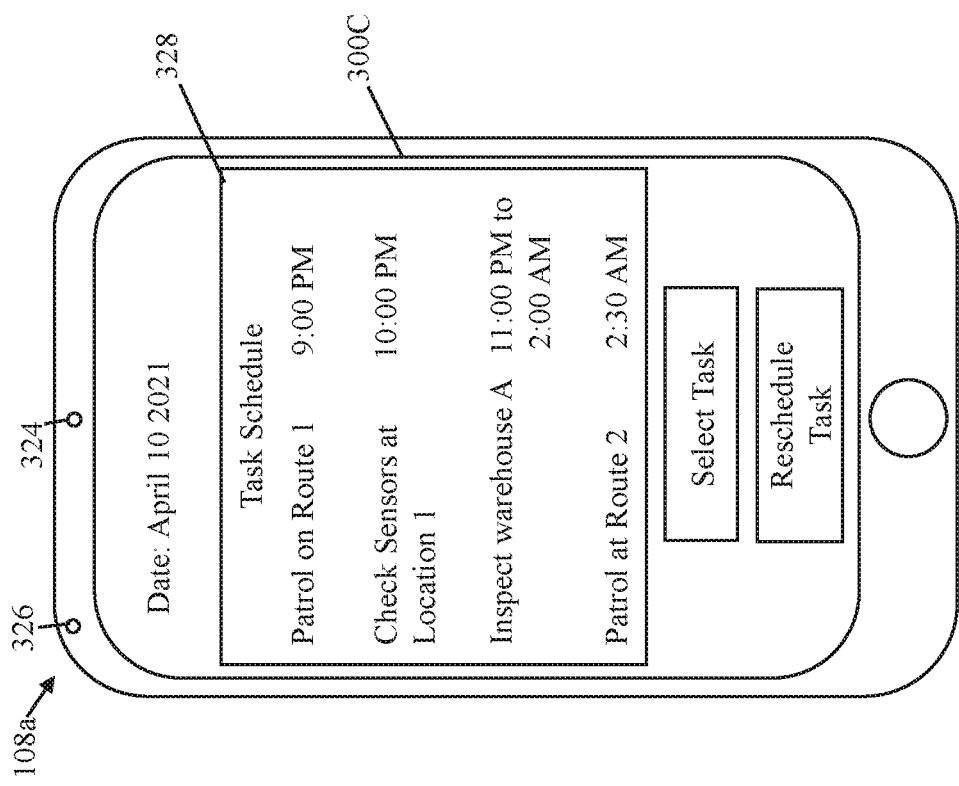

FIGS. 3B and 3C are diagrams that, collectively, illustrate a GUI of the operator application, in accordance with an exemplary embodiment of the disclosure. Referring to FIG. 3B, a GUI 300B of the service application implemented on the first operator device 108a is illustrated.

The GUI 300B represents a second digital map 322. The second digital map 322 may present another view (e.g., a 2-dimensional or a 3-dimensional) of the housing society illustrated in FIG. 3A. The second digital map 322 represents the swimming pool 304, the residential area 306, and the parking zone 308. The second digital map 322 may further represent the driving lane 310. A patrol route of the first operator 109a associated with the first operator device 108a is presented by way of a dotted line passing through the driving lane 310. Further, a current location of the first operator 109a is detected using a GPS tracker (not shown) of the first operator device 108a.

The GUI 300B may further present an "Emergency" option to the first operator 109a. Upon selection of the "Emergency" option, the GUI 300B may provide one or more options for contacting at least one of the government authority, the housing society authority, one or more operators, or the like. In one example, the "Emergency" option may be selected by the first operator 109a to request for back-up while handling the security alert. Upon selection of the "Emergency" option, the GUI 300B may provide the first operator 109a an option to contact another operator who is closest (or nearest) to the residential area 306. In an embodiment, based on selection of the "Emergency" option on the first operator device 108a, the application server 104 may be configured to communicate a notification to an operator device of another operator to instruct the other operator to reach the site of the security alert. In an example, referring to FIG. 3B, the first operator 109a, upon reaching the site of the security alert, may select the "Emergency" option to call another operator 312 for back-up.

The GUI 300B may further present a "Request for Route Update" option to the first operator 109a. The "Request for Route Update" may be selectable by the first operator 109a in an instance when the first operator 109a is dissatisfied with a current patrol route. In one example, the "Request for Route Update" may be selectable to request a preferred route of patrolling.

The GUI 300B may further present another option "Upload Voice Note". The "Upload Voice Note" option may be selected by the first operator 109a to upload an audio file that may describe the security alert, the current condition at the site of the security alert, the cause of the security alert, the measure taken to handle the security alert, or the like. The service application may use a voice recorder 324 of the first operator device 108a for recording the voice note.

The GUI 300B may further present an option "Upload Image/Video". The "Upload Image/Video" option may be used by the first operator 109a to capture and communicate one or more images or videos of at least one of the site of the security alert, the cause of the security alert, the measure taken by the first operator 109a to handle the security alert, or the like. The service application may use a camera 326 of the first operator device 108a for capturing the images and/or the videos.

The GUI 300B may further present an option "Current Status" for acquiring a real-time report/feedback from the first operator 109a via corresponding operator device 108a. The current status may be acquired in form of a textual input, an audio input, a graphical input, or a symbolic input. The application server 104 may use the current status received from the first operator device 108a as feedback to improve proactiveness of the security system.

Referring to FIG. 3C, another GUI 300C of the service application implemented on the first operator device 108a is illustrated. The GUI 300C represents a task schedule 328 for the first operator 109a associated with the first operator device 108a. As shown, the task schedule 328 corresponds to a date "Apr. 10, 2021". However, in other embodiments, the task schedule 328 may correspond to a weekly schedule or a monthly schedule. The task schedule 328 includes a list of tasks scheduled for the first operator 109a on "Apr. 10, 2021". The list may include a plurality of tasks and corresponding time for execution of the task. As shown, a task "Patrol on Route 1" is to be executed at "9:00 PM", a task "Check Sensors at Location 1" is to be executed at "10:00 PM", a task "Guard Warehouse A" is to be executed during "11:00 PM to 2 AM", and a task Patrol on Route 2" is to be executed at "2:30 AM".

The GUI 300C further presents, an option "Select Task" to manually select a task from the task schedule 328. The first operator 109a may select a task from the task schedule 328 based on their preference in a sequence of execution of the plurality of tasks. A cause or request for such manual selection may be provided by the first operator 109a via the voice recorder 324 and/or the camera 326 of the first operator device 108a.

The GUI 300C presents another option "Reschedule task" to initiate a rescheduling of a sequence and/or timing of the plurality of tasks. In an embodiment, the option "Reschedule task" may initiate a reallocation of tasks allotted to the first operator 109a to another operator or rescheduling of the tasks to another time for the first operator 109a. A cause or request for such rescheduling or reallocation may be provided by the first operator 109a via the voice recorder 324 and/or the camera 326 of the first operator device 108a. In an embodiment, the task schedule 328 may be updated by the application server 104 are regular intervals of time or based on rescheduling or reallocation requests.

It will be apparent to a person skilled in the art that the GUIs 300B and 300C disclosed herein are exemplary. In other embodiments, the GUIs 300B and 300C of the first operator device 108a may be different and may include additional or different options. The GUIs 300B and 300C are shown to be digital however in other embodiments, the GUIs 300B and 300C may be represented via at least one of an augmented reality (AR) interface, a virtual reality (VR) interface, and a mixed reality (MR) interface.

In an embodiment, the application server 104 may determine the alertness level of the first operator 109a based on one or more sensors integrated with the first operator device 108a. In one example, sensor data of a motion sensor of the first operator device 108a may be observed by the application server 104 to determine whether the first operator 109a is awake. In another example, sensor data of a GPS sensor of the first operator device 108a may be observed by the application server 104 to determine whether the first operator 109a is patrolling.

In another embodiment, the application server 104 may be configured to rate the first operator 109a based on their alertness level and performance in the recent past. The performance of the first operator 109a may be analyzed based on their approach towards handling a security alert, a count of missed security alert handling instances, activeness in reaching the site of the security alert, or the like.

The application server 104, based on data received from the first operator device 108a and the service application running on the first operator device 108a, may generate a report (for example, a performance report) regarding the performance of the first operator 109a. The report may be communicated to various stakeholders (for example, the operators 109, the user 111, an authority associated with the integrated security management system) associated with the integrated security management system. The report may be further used, by the authority associated with the integrated security management system, for determining a subsequent action (for example, on-boarding, off-boarding, incentivizing, penalizing, or the like) for the first operator 109a. In some embodiments, the user 111 may recommend or black-list the first operator 109a based on the received report.

Figure 4:
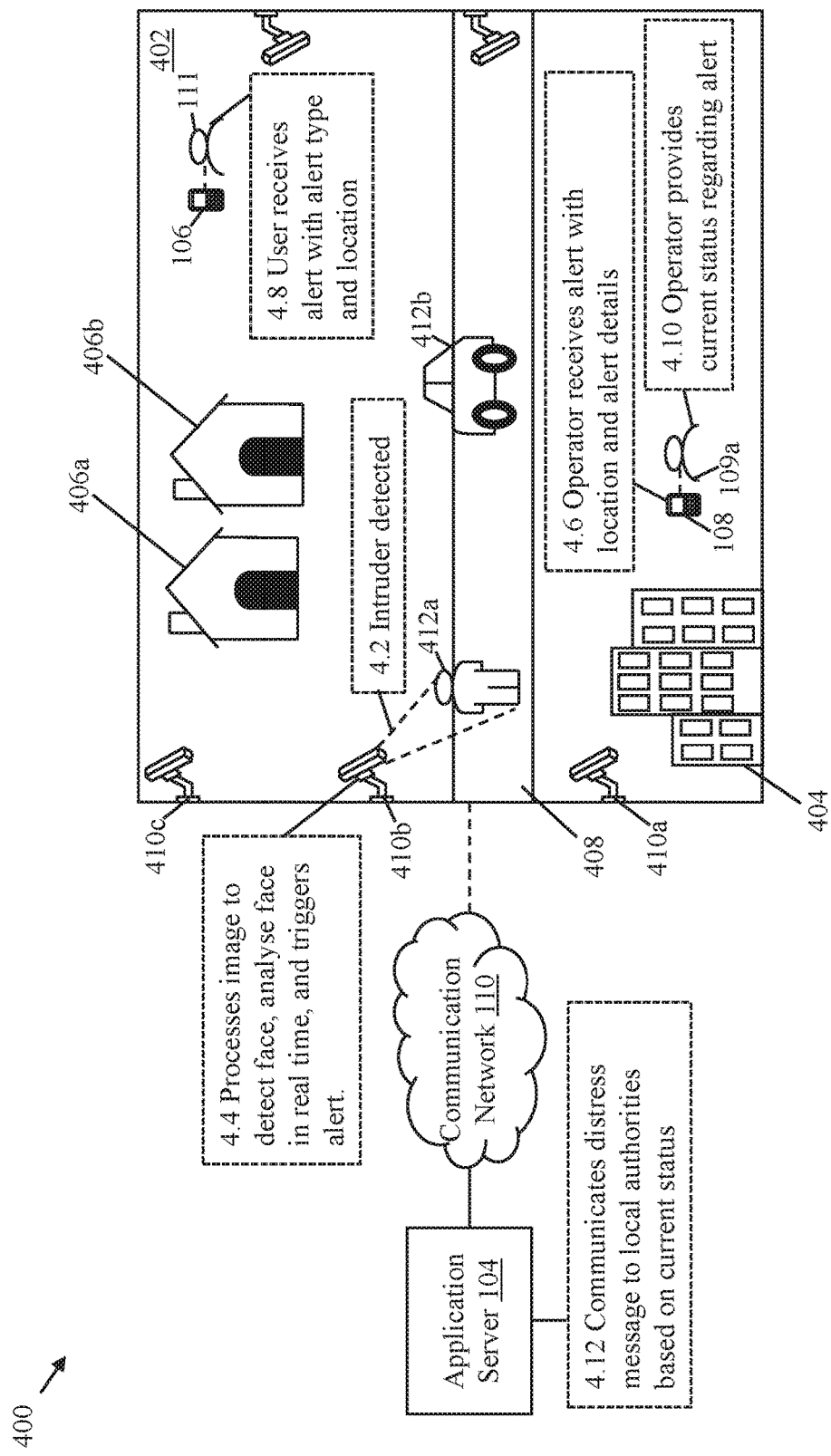
FIG. 4 is a diagram that illustrates an exemplary implementation of an integrated security management system, in accordance with an exemplary embodiment of the disclosure.

FIG. 4 is a diagram that illustrates an exemplary implementation of the integrated security management system, in accordance with an exemplary embodiment of the disclosure. Referring to FIG. 4, shown is an exemplary implementation 400 of the integrated security management system within a medical facility campus 402. The medical facility campus 402 includes a medical facility 404, staff quarters 406a and 406b (hereinafter, "staff quarters 406a and 406b" are referred to as "staff quarters 406"). The medical facility campus 402 is further shown to include a lane 408. The lane 408 may be used by vehicles during the night and by walkers during the day. The medical facility campus 402 further includes a plurality of imaging devices (for example, first through third security cameras 410a through 410c). The plurality of imaging devices is deployed within the medical facility campus 402 in such a way that the plurality of imaging devices captures a live video feed of the entire medical facility campus 402.

The application server 104 may store security alert detection rules associated with the medical facility campus 402. In an example, the defined rules may include: a first rule to indicate that vehicles are prohibited from driving on the lane 408 from 6 AM and 10 PM and a second rule to indicate that walkers are prohibited from walking on the lane 408 from 10 PM and 6 AM.

At 4.2, the second security camera 410b may capture videos and images of the lane 408. In an exemplary scenario, the second security camera 410b may capture an individual 412a roaming on the lane 408. The second security camera 410b may perform a check to determine whether any of the defined rules is being violated that is to say if a current time is between 10 PM and 6 AM. In one example, the current time may be 8 AM, therefore no security alert is detected and no action is performed. In another example, when the time is 11 PM, the second security camera 410b may detect a security alert due to the violation of second rule. In another exemplary scenario, the second security camera 410b may capture a vehicle 412b being driven on the lane 408. The second security camera 410b may perform the check to determine whether any of the defined rules is being violated that is to say if a current time is between 6 AM and 10 PM. In one example, the current time may be 1 AM, therefore no security alert is detected and no action is performed. In another instance, when the time is 9 AM, the second security camera 410b may detect a security alert due to the violation of the first rule.

At 4.4, the second security camera 410b may perform facial recognition to identify, a face of the individual 412a. Alternatively, the second security camera 410b may process the captured image to identify an identification number of the vehicle 412b. The detected face or the identification number is analyzed in real time by the second security camera 410b. The second security camera 410b may be configured to communicate the detected security alert and the first sensor data (for example, the captured video and image) to the application server 104. In an embodiment, the second security camera 410b may trigger an alert by way of a visual indicator that may be observed by an operator patrolling near the second security camera 410b. The second security camera 410b may communicate the first sensor data to the application server 104 based on the alert. The application server 104 upon receiving the first sensor data from the second security camera 410b may provide the first sensor data to the trained classification model 138. The trained classification model 138 may output a match or no match status of the first sensor data with the security alert detection rule of the medical facility campus 402. Based on a match status of the first sensor data with the security alert detection rules as outputted by the trained classification model 138, the application server 104 may detect the security alert.

Based on detection of the security alert, the application server 104 may determine a patrol route that encompasses a location of the security alert. Further, the application server 104 may be configured to communicate a surveillance request to an operator device of an operator that is nearest to a location of the detected security alert. In an embodiment, the application server 104 may further communicate an alert to the user 111 associated with the user device 106.

In an embodiment, the second security camera 410b may fail to detect the face of the individual 412a due to low quality of the captured image or the face of the individual 412a being obscured from view. In such an embodiment, the second security camera 410b may detect additional or alternate features associated with the individual 412a for identification and authentication of the individual 412a. Such features may include height, physique, a physical uniqueness, an identification mark, complexion, or the like of the individual 412a. The second security camera 410b may be further configured to determine a context associated with the captured image. In an example, the second security camera 410b may fail to detect the face of the individual 412a based on the captured image. Upon determination of the context of the captured image, the second security camera 410b may determine that the individual 412a is wearing a uniform of a courier service and is delivering a parcel.

At 4.6, the first operator device 108a of the first operator 109a designated for patrolling the lane 408 receives the surveillance request including the location (for example, a landmark, latitude/longitude, or the like) and alert details including a time of alert, a cause of the alert, a response time, a severity of the security alert, or the like. The first operator device 108a receives the surveillance request including the location and the alert details from the application server 104 via the communication network 110.

At 4.8, the user device 106 associated with the user 111 of the integrated security management system receives the location (for example, a landmark, latitude/longitude, or the like) and the alert details including the time of the alert, the cause of the alert, the response time, the severity of the security alert, or the like. The user device 106 receives the location and the alert details from the application server 104 via the communication network 110.

At 4.10, the first operator 109a reaches the site of the security alert communicated via the first operator device 108a and takes necessary actions as indicated by the alert. A current status at the site is communicated via the first operator device 108a to the application server 104 and the user device 106.

At 4.12, the application server 104 may further communicate a distress message to local authorities such as the police, medical facility campus authority, a head of security, or the like. The application server 104 may communicate the distress message based on the current status at the site of the security alert. In an embodiment, the application server 104 may be configured to communicate the distress message to the local authorities based on analysis of the sensor data from the second security camera 410b.

In an embodiment, the application server 104, based on the facial recognition performed by the second security camera 410b, may determine that the individual 412a is a doctor at the medical facility 404. Therefore, the application server 104 may communicate the distress message to a security in-charge of the medical facility campus 402 or a nearest operator. In another embodiment, the application server 104 may determine that although the individual 412a is wearing a doctor's uniform, the individual 412a is not associated or linked with the medical facility campus 402. Therefore, the application server 104 may communicate the distress message to at least one of local police, an emergency contact, a security head of the medical facility campus 402, or the like.

In another embodiment, the application server 104, based on the identified identification number of the vehicle 412b, may determine that the vehicle 412b is an ambulance. However, the vehicle 412b is parked at a side of the lane 408. Therefore, the application server 104 may communicate the alert message to the nearest operator. The application server 104 may receive a feedback from the nearest operator that a new parking zone has been constructed to park ambulance at the side of the lane 408. Therefore, the application server 104 may update the security alert handling dataset to reflect presence of the parking zone at the side of the lane 408. In such embodiments, the application server 104 may identify the one or more sensors (for example, one or more image sensors) that are deployed at the location of the security alert, e.g., at the new parking zone and have the sensing range that covers the new parking zone. The application server 104 may receive the second sensor data (for example, image or video data) from the identified one or more sensors (for example, the one or more image sensors) while the location of the operator device 108a is same as the location of the security alert i.e., the new parking zone. Hence, the application server 104 may determine the security alert to be a false positive. Therefore, the application server 104 may re-train the classification model 138 to learn a rule regarding existence of the new parking zone.

In some embodiments, the application server 104 may determine that although the vehicle 412b resembles an ambulance of the medical facility 404, the identification number of the vehicle 412b does not match with any ambulance of the medical facility 404. Therefore, the application server 104 may communicate the distress message to at least one of local police, an emergency contact, a security head of the medical facility campus 402, or the like.

It will be apparent to a person skilled in the art that FIG. 4 illustrates a non-limiting exemplary implementation of the integrated security management system disclosed herein. In other implementations, the integrated security management system may be deployed in different environments and may have different and additional components that may perform similar or different operations.

In another example, the target area 102 may be a manufacturing plant. The manufacturing plant may include two conveyor belts. A first conveyor belt dedicated to transport small-sized packages from a first location to a second location and a second conveyor belt dedicated to transport large-sized packages from the first location to the second location. The imaging device 114 may detect a security alert based on capturing of an image presenting a large-sized package being transferred on the first conveyor belt. Therefore, the imaging device 114 may communicate corresponding first sensor data and the detected anomaly to the application server 104. The application server 104 may detect the security alert based on the first sensor data and may communicate a distress message to an operator and/or a relevant authority (for example, a manufacturing supervisor). The application server 104 may receive a feedback indicating a weight of the large-sized package being within a threshold limit hence the large-sized package may be transported via the first conveyor belt. Subsequently, the application server 104 may re-train the classification model 138 and update the security alert resolution dataset to include an action of verifying a weight of a package while detecting such a security alert. In an embodiment, weight data may be obtained by the application server 104 from various weight sensors deployed on the first and second conveyor belts.

In another exemplary scenario, a task of manufacturing a pharmaceutical product may include a fixed sequence of steps. Based on a deviation in the sequence, the imaging device 114 may be configured to detect a security alert and communicate the detected anomaly and corresponding first sensor data to the application server 104. The application server 104 may detect a security alert based on the received first sensor data and may dispatch a security operator for resolution of the security alert. The security operator may be directed by the application server 104, by way of communication of a surveillance request, to initiate a resolution of the security alert based on a corresponding security alert handling action included in the security alert resolution dataset.

Figure 5B:
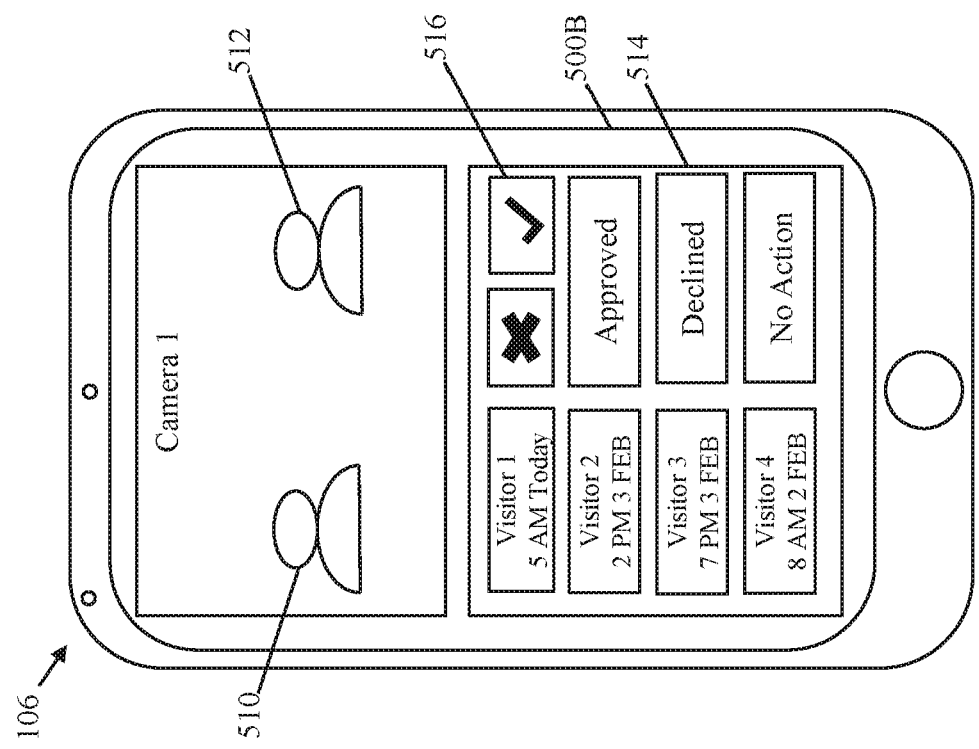
FIGS. 5A and 5B are diagrams that, collectively, illustrate user interfaces of the user application, in accordance with another exemplary embodiment of the disclosure.
Figure 5A:
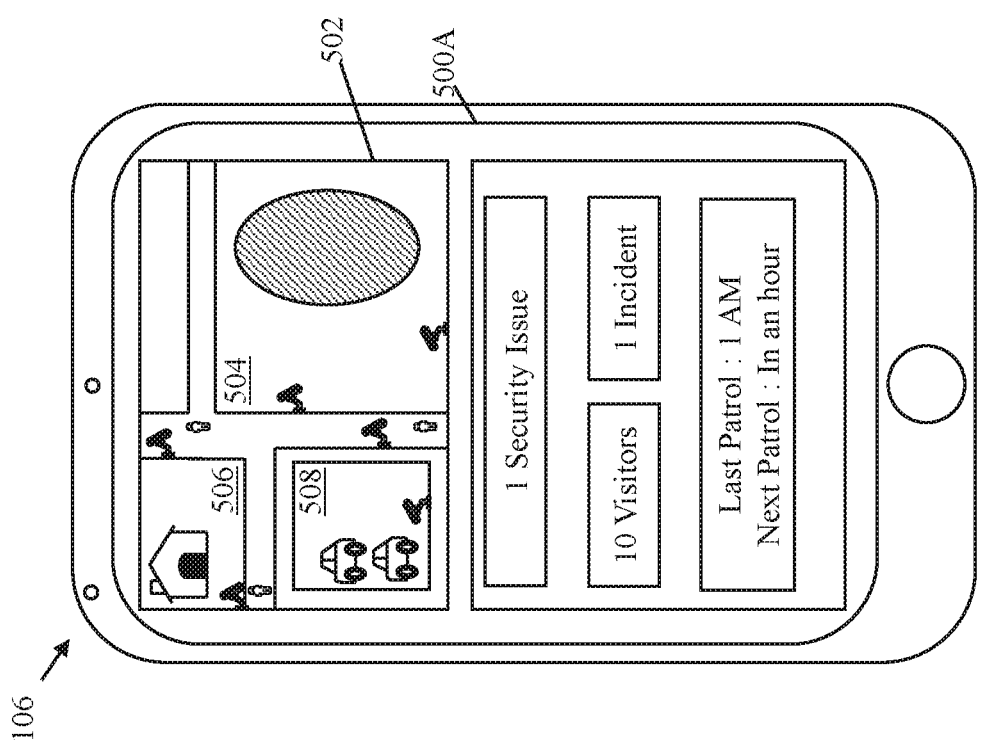

FIGS. 5A and 5B are diagrams that, collectively, illustrate a GUI of the user application, in accordance with another exemplary embodiment of the disclosure. Referring to FIG. 5A, illustrated is a GUI 500A of the user application presented via the user device 106. As shown, the GUI 500A presents a personalized digital map 502 of the target area 102 to the user 111. The personalized digital map 502 may present one or more regions within the target area 102 that are relevant to the user 111. In an example, the target area 102 may be a farm house. Therefore, the personalized digital map 502 may present a crop field 504, a residential area 506 and a parking area 508 to the user 111. In another example, the target area 102 may be a residential society with multiple buildings A-D, and the user 111 may be a resident of the building A. In such a scenario, the personalized digital map 502 may present an area within a radius of 500 meters of the building A and an area outside a flat of the user 111.

The GUI 500A may present a count of security issues (for example, a faulty camera) present within the target area 102. The GUI 500 may further present a count of visitors visiting the target area 102. The count of visitors may be for a specific day or for within a defined time interval (for example, a week, two weeks, or the like). The GUI 500A may further present a count of incidents that have occurred within the target area 102. The count of incidents may be associated with a specific day or the defined time interval. An incident may refer to a security breach such as a forceful entry, a theft, or the like. The GUI 500A may further present information i.e., time associated with last patrol of an operator near a location of the user device 106 and a next patrol of the same or different operator near the location of the user device 106. In an embodiment, information being presented via the GUI 500A is with respect to the entire target area 102. In another embodiment, the information being presented via the user interface 500A is with respect to a security camera deployed within the target area 102.

Referring to FIG. 5B, illustrated is another GUI of the user application presented via the user device 106. As shown, the GUI 500B presents one or more faces (for example, visitor 1 510 and visitor 2 512) detected by a Camera 1. The GUI 500B may further present a list of visitors 514 detected by the camera 1. As shown, the list of visitors 514 includes Visitor 1, Visitor 2, Visitor 3, and Visitor 4. The list 514 further includes details including a date and time of visit corresponding to the visitors. The GUI 500B may further enable the user 111 to approve entry of a visitor by selecting a checked box 516 or deny entry of the visitor by selecting a crossed box shown beside the checked box 516. The GUI 500B may further present a history regarding an action taken by the user 111 for approving or declining a visitor. As shown, the list 514 presents that entry of the Visitor 2 has been approved by the user 111, entry of the Visitor 3 has been declined, and no action was taken by the user 111 for approving or declining the entry of the Visitor 4.

It will be apparent to a person skilled in the art that the GUIs 500A and 500B are exemplary. In other embodiments, the GUIs 500A and 500B may include additional or different options without departing from the scope of the disclosure. The GUIs 500A and 500B are shown to be digital however in other embodiments, the GUIs 500A and 500B may be represented via at least one of an augmented reality (AR) interface, a virtual reality (VR) interface, and a mixed reality (MR) interface.

Figure 6:
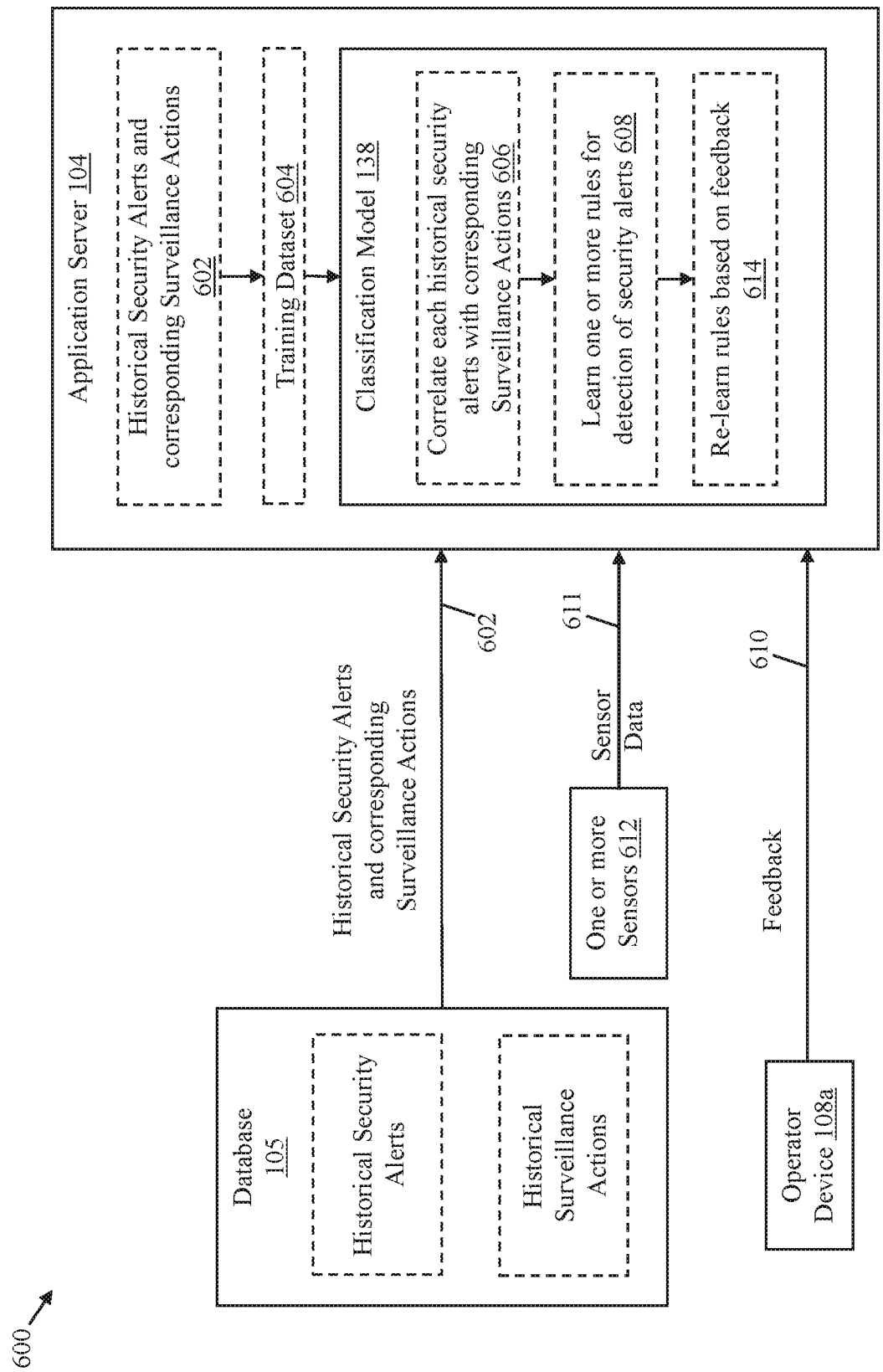
FIG. 6 is a block diagram that illustrates training and re-training of a classification model for detection of security alerts, in accordance with an exemplary embodiment of the disclosure.

FIG. 6 is a block diagram that illustrates training and re-training of the classification model for detection of security alerts, in accordance with an exemplary embodiment of the disclosure. Referring to FIG. 6, a block diagram 600 is shown that illustrates training and re-training of the classification model 138.

As shown, the database 105 may store a log of historical security alerts and corresponding surveillance actions taken in the past to resolve the historical security alerts. The application server 104, at 602, may receive the historical security alerts and corresponding surveillance actions from the database 105. The application server 104 may create, at 604, a training dataset comprising the historical security alerts and corresponding surveillance actions and provide the training dataset to the classification model 138 for training the classification model 138 for security alert detection. The application server 104 may be configured to train the classification model 138, based on the training dataset, to learn one or more rules for detection of the security alert. The classification model 138 may be configured to correlate, at 606, the historical security alerts and corresponding surveillance actions, and learn, at 608, one or more rules for detection of the security alert based on the correlation. For example, a historical security alert may have been raised due to an increase in temperature beyond X ° C. and detection of smoke, and the historical surveillance action may have been to call a fire extinguisher team for extinguishing the fire. Here, the classification model 138 may learn a rule that detects a security alert when temperature sensed by a temperature sensor is beyond X ° C. and a presence of smoke is detected by a smoke sensor. To resolve such a security alert, the classification model 138 may learn a surveillance action of calling the fire extinguisher team to extinguish the fire. Once the classification model 138 is trained, the application server 104 may utilize the trained classification model 138 to detect and resolve security alerts in the target area 102.

In some embodiments, during implementation phase of the classification model 138 after training, the application server 104 may receive a feedback from the operator device 108a or the user device 106 regarding a security alert detection being false positive, at 610. In such embodiments, the application server 104, at 611, may provide sensor data (e.g., the second sensor data) received from one or more sensors 612 that have a sensing range that cover the location of the detected security alert to the trained classification model 138 for re-training. The second sensor data may refer to sensor data received in real-time or near real-time from the one or more sensors 612. Based on the second sensor data, the trained classification model 138, at 614, may re-learn one or more new rules or update an existing rule for security alert detection. In an example, an existing rule may state that a temperature beyond X ° C. is due to a fire starting at a corresponding location. However, based on the feedback received from the operator device 108a may indicate that the temperature beyond X ° C. was due to a bonfire celebration. In such a scenario, the application server 104 may provide the second sensor data received from the one or more sensors 612 deployed at the specific location to the trained classification model 138. The second sensor data may be received by the application server 104 when the location of the operator device 108a is same as a location where the security alert was detected. The second sensor data may include temperature sensor data, video recordings, audio recordings, or the like. The trained classification model 138 may update the existing rule to include an exception that if the temperature beyond X ° C. is detected due to a bonfire, no security alert is to be raised.

In another example, the application server 104 may receive a feedback from the operator device 108a indicative of a security alert of an intrusion in a restricted area being false positive. Therefore, the application server 104 may receive the second sensor data from the one or more sensors deployed in the restricted area and having a sensing range that covers the restricted area while the location of the operator device 108a of the operator 109a is same as location of the security alert i.e., the restricted area. The one or more sensors may include the imaging device 114. Based on analysis of sensor data received from the imaging device 114, the trained classification model 138 may determine that the intruder in the restricted area may be a stray animal. Hence, the trained classification model 138 may learn a new rule that states to check real-time or near real-time images or video recording of the restricted area before detection of the security alert associated with intrusion.

Figure 7:
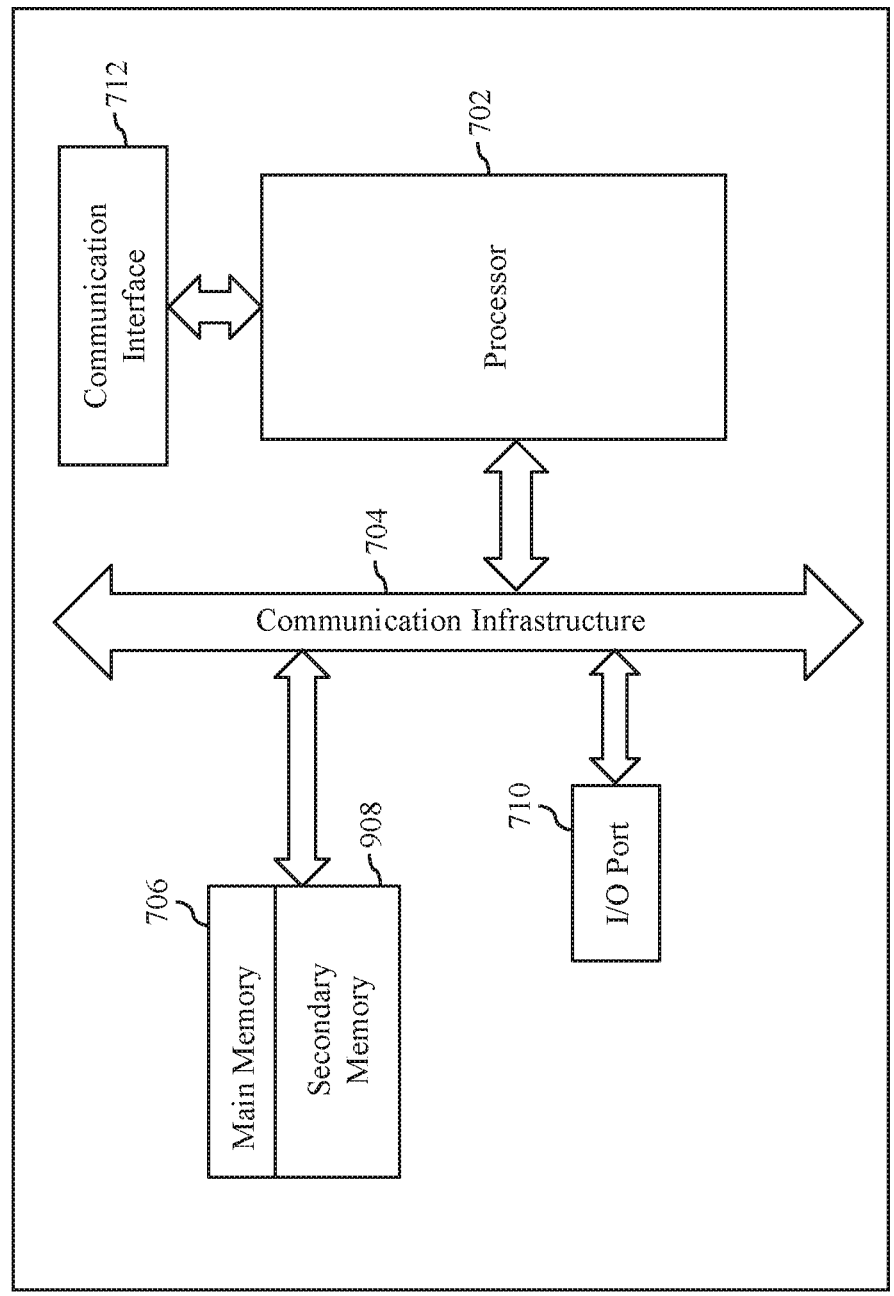
FIG. 7 is a block diagram that illustrates a system architecture of a computer system for implementing the integrated security management system, in accordance with an exemplary embodiment of the disclosure.

FIG. 7 is a block diagram that illustrates a system architecture of a computer system 700 in implementing the integrated security management system within the target area 102, in accordance with an exemplary embodiment of the disclosure. An embodiment of the disclosure, or portions thereof, may be implemented as computer readable code on the computer system 700. In one example, the application server 104 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 8 and 9A-9B.

The computer system 700 may include a processor 702 that may be a special purpose or a general-purpose processing device. The processor 702 may be a single processor or multiple processors. The processor 702 may have one or more processor "cores." Further, the processor 702 may be coupled to a communication infrastructure 704, such as a bus, a bridge, a message queue, the communication network 110, multi-core message-passing scheme, or the like. The computer system 700 may further include a main memory 706 and a secondary memory 708. Examples of the main memory 706 may include RAM, ROM, and the like. The secondary memory 708 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 700 may further include an input/output (I/O) port 710 and a communication interface 712. The I/O port 710 may include various input and output devices that are configured to communicate with the processor 702. Examples of the input devices may include a keyboard, a mouse, a joystick, a touchscreen, a microphone, and the like. Examples of the output devices may include a display screen, a speaker, headphones, an AR interface, a VR interface, and MR interface, and/or the like. The communication interface 712 may be configured to allow data to be transferred between the computer system 700 and various devices that are communicatively coupled to the computer system 700. Examples of the communication interface 712 may include a modem, a network interface, i.e., an Ethernet card, a communication port, and the like. Data transferred via the communication interface 712 may be signals, such as electronic, electromagnetic, optical, or other signals as will be apparent to a person skilled in the art. The signals may travel via a communication channel, such as the communication network 110, which may be configured to transmit the signals to the various devices that are communicatively coupled to the computer system 700. Examples of the communication channel may include a wired, wireless, and/or optical medium such as cable, fiber optics, a phone line, a cellular phone link, a radio frequency link, and the like. The main memory 706 and the secondary memory 708 may refer to non-transitory computer readable mediums that may provide data that enables the computer system 700 to implement the methods of FIGS. 8 and 9A-9B.

FIG. 8 is a flowchart that illustrates a method for implementing the integrated security management system, in accordance with an exemplary embodiment of the disclosure. With reference to FIG. 8, there is shown a flowchart 800 that includes exemplary operations 802 through 818 for implementing the integrated security management system.

At 802, the first sensor data is received from the plurality of sensors. The application server 104 may be configured to receive the first sensor data from the plurality of sensors deployed within the target area 102.

At 804, the first sensor data is provided to the trained classification model 138 as the input. The application server 104 may be configured to provide the first sensor data to the trained classification model 138 as the input.

At 806, the security alert is detected in the target area 102, based on the output of the trained classification model 138. The application server 104 may be configured to detect, based on the output of the trained classification model 138, the security alert in the target area 102.

At 808, the patrol route that encompasses the location of the security alert is determined. The application server 104 may be configured to determine the patrol route that encompasses the location of the detected security alert.

At 810, the surveillance request to patrol the patrol route for security check is transmitted to the operator device 108a of the operator 109a based on the detection of the security alert. The application server 104 may be configured to transmit, to the operator device 108a of the operator 109a, the surveillance request to patrol the patrol route for security check based on the detection of the security alert.

At 812, the one or more sensors of the plurality of sensors that have the sensing range that covers the location of the security alert are identified. The application server 104 may be configured to identify the one or more sensors 612 of the plurality of sensors that have the sensing range that covers the location of the security alert.

At 814, the second sensor data is received, in real-time or near real-time, from the identified one or more sensors 612 based on the location of the operator device 108a being same as the location of the security alert. The application server 104 may be configured to receive the second sensor data, in real-time or near real-time, from the identified one or more sensors 612 based on the location of the operator device 108a being same as the location of the security alert.

At 816, the classification model 138 is re-trained based on the second sensor data when the feedback received from the operator device 108a indicates the security alert to be false positive.

In another embodiment, detection of security alert may be performed by the plurality of sensors instead of the application server 104, without deviating from the scope of the disclosure. In such an embodiment, the plurality of sensors may be configured to communicate the generated first sensor data to the application server 104 and the application server 104 may be configured to verify the detected security alert based on the received first sensor data.

Figure 9A:
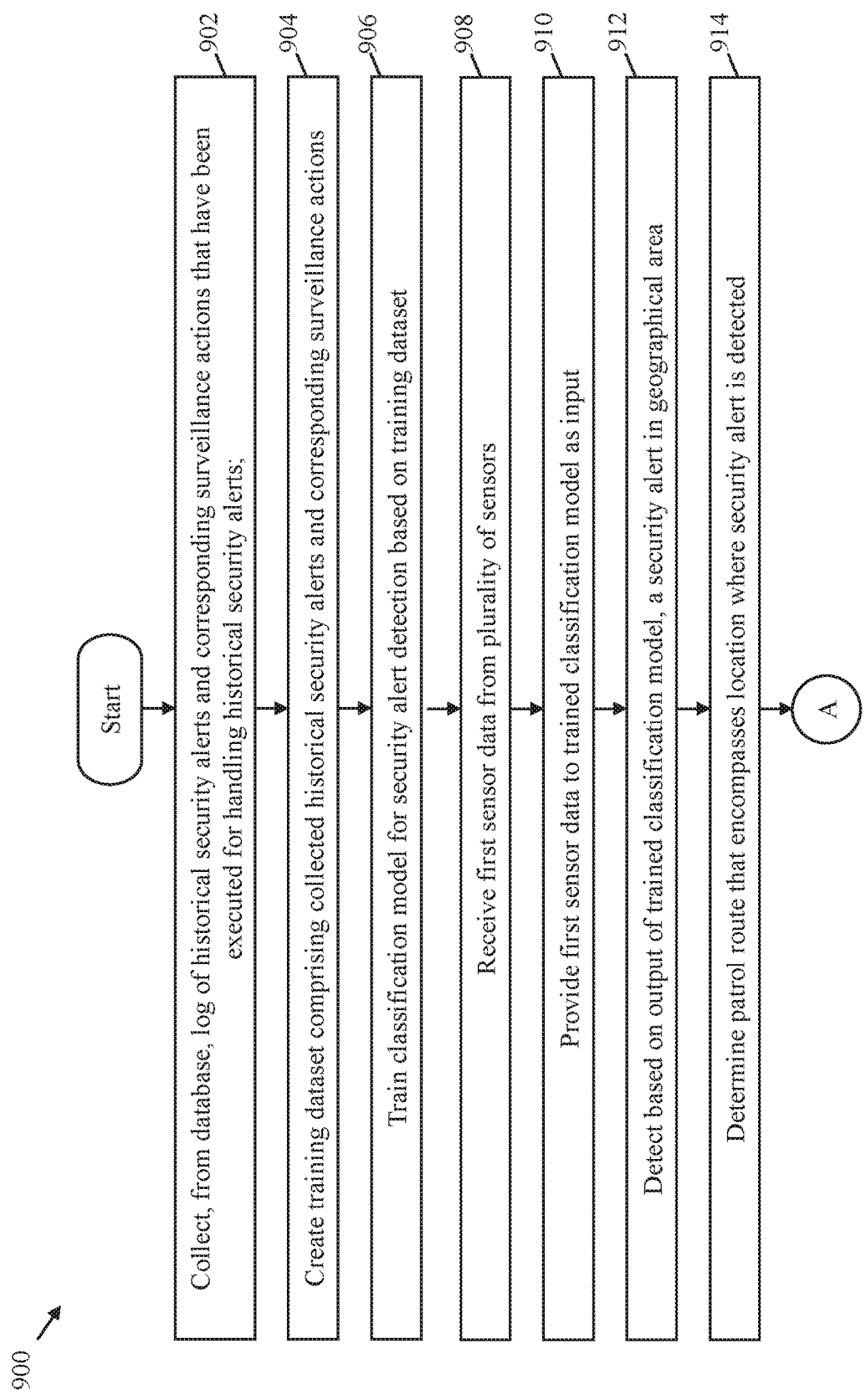
FIGS. 9A and 9B, collectively, represent a flowchart that illustrates another method of implementing the integrated security management system, in accordance with an exemplary embodiment of the disclosure.
Figure 9B:
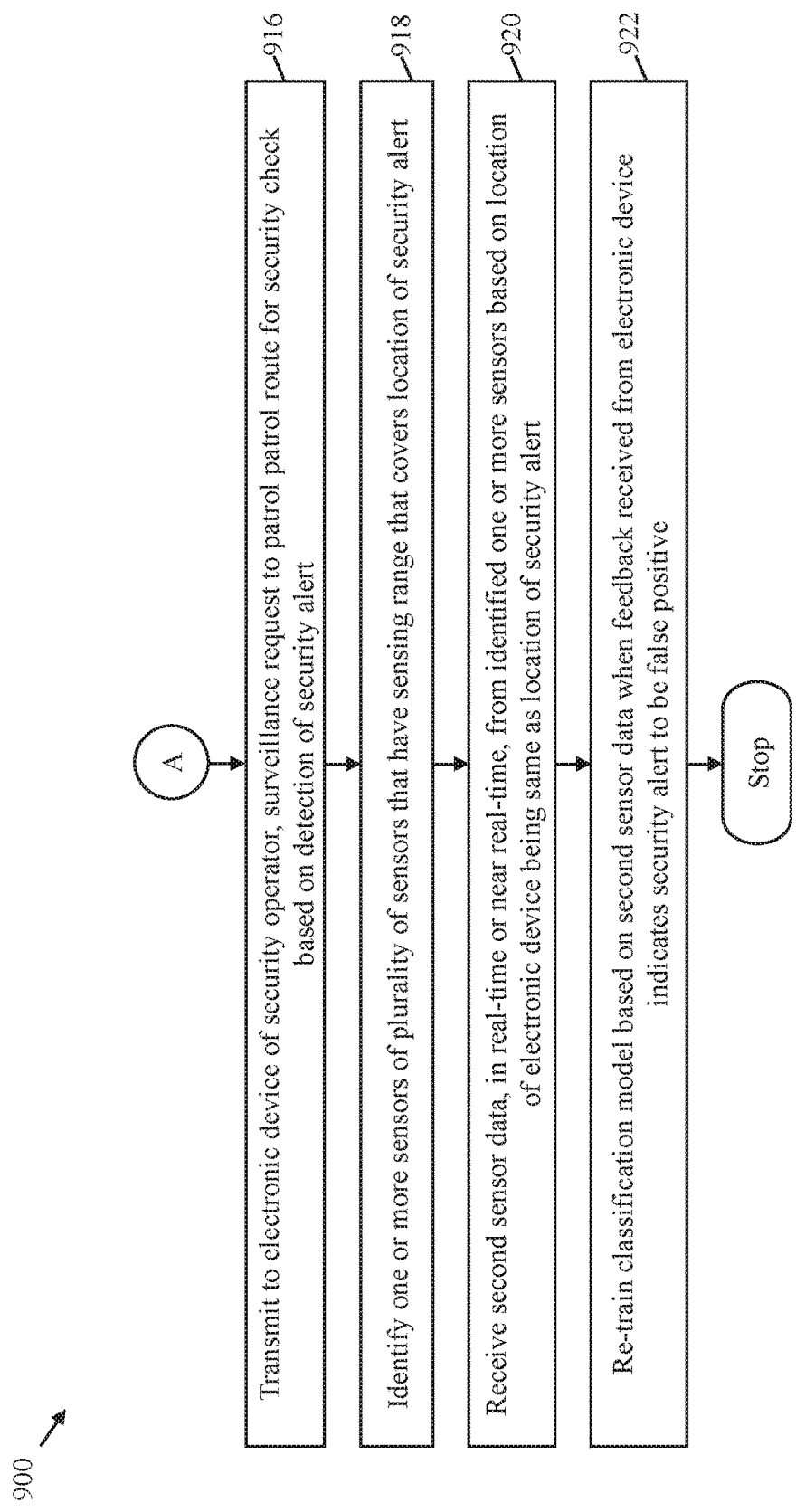

FIGS. 9A and 9B, collectively, represent a flowchart that illustrates a method for implementing the integrated security management system, in accordance with an exemplary embodiment of the disclosure. With reference to FIGS. 9A and 9B, there is shown a flowchart 900 that includes exemplary operations 902 through 922 for implementing the integrated security management system.

Referring to FIG. 9A, at 902, the log of historical security alerts and corresponding surveillance actions that have been executed for handling each of the historical security alerts are collected from the database 105. The application server 104 may be configured to collect, from the database 105, the log of historical security alerts and corresponding surveillance actions that have been executed for handling each of the historical security alerts.

At 904, the training dataset comprising the collected historical security alerts and corresponding surveillance actions is created. The application server 104 may be configured to create the training dataset comprising the collected historical security alerts and corresponding surveillance actions.

At 906, the classification model 138 is trained for the security alert detection based on the training dataset. The application server 104 may be configured to train the classification model 138 for the security alert detection based on the training dataset. The classification model 138 learns one or more rules for detection of the security alert.

At 908, the first sensor data is received from the plurality of sensors. The application server 104 may be configured to receive the first sensor data from the plurality of sensors deployed within the target area 102.

At 910, the first sensor data is provided to the trained classification model 138. The application server 104 may be configured to provide the first sensor data to the trained classification model 138.

At 912, the security alert is detected in the target area 102, based on the output of the trained classification model 138. The application server 104 may be configured to detect, based on the output of the trained classification model 138, the security alert in the target area 102.

At 914, the patrol route that encompasses the location where the security alert is determined. The application server 104 may be configured to determine the patrol route that encompasses the location where the security alert is detected.

Referring now to FIG. 9B, at 916, the surveillance request to patrol the patrol route for security check is transmitted to the operator device 108a of the operator 109a based on the detection of the security alert. The application server 104 may be configured to transmit, to the operator device 108a of the operator 109a, the surveillance request to patrol the patrol route for security check based on the detection of the security alert.

At 918, the one or more sensors of the plurality of sensors that have the sensing range that covers the location of the security alert are identified. The application server 104 may be configured to identify the one or more sensors 612 of the plurality of sensors that have the sensing range that covers the location of the security alert.

At 920, the second sensor data is received, in real-time or near real-time, from the identified one or more sensors 612 based on the location of the operator device 108a being same as the location of the security alert. The application server 104 may be configured to receive the second sensor data, in real-time or near real-time, from the identified one or more sensors 612 based on the location of the operator device 108a being same as the location of the security alert.

At 922, the classification model 138 is re-trained based on the second sensor data when the feedback received from the operator device 108a indicates the security alert to be false positive. The application server 104 may be configured to re-train the classification model 138 based on the second sensor data when the feedback received from the operator device 108a indicates the security alert to be false positive.

Various embodiments of the disclosure provide the application server 104 for implementing the integrated security management system. The application server 104 may be configured to receive the first sensor data from the plurality of sensors. The application server 104 may be further configured to provide the first sensor data to the trained classification model 138 as the input. The application server 104 may be further configured to detect, based on the output of the trained classification model 138, the security alert in the target area 102. The application server 104 may be further configured to determine the patrol route that encompasses the location where the security alert is detected. The application server 104 may be further configured to transmit, to the first operator device 108a of the first operator 109a, the surveillance request to patrol the patrol route for security check based on the detection of the security alert. The application server 104 may be further configured to identify the one or more sensors of the plurality of sensors that have the sensing range that covers the location of the security alert. The application server 104 may be further configured to receive the second sensor data, in real-time or near real-time, from the identified one or more sensors based on the location of the operator device 108a being same as the location of the security alert. The application server 104 may be further configured to re-train the classification model 138 based on the second sensor data when the feedback received from the first operator device 108a indicates the security alert to be the false positive.

Various embodiments of the disclosure provide a non-transitory computer readable medium having stored thereon, computer executable instructions, which when executed by a computer, cause the computer to execute one or more operations for implementing the integrated security management system. The one or more operations include receiving, by the application server 104, the first sensor data from the plurality of sensors that are (i) communicatively coupled to the application server 104, (ii) deployed in the target area 102, and (iii) collectively have the sensing range that covers the target area 102. The one or more operations further include providing, by the application server 104, the first sensor data to the trained classification model 138 as the input. The one or more operations further include detecting, by the application server 104, based on the output of the trained classification model 138, the security alert in the target area 102. The one or more operations further include determining, by the application server 104, the patrol route that encompasses the location where the security alert is detected. The one or more operations further include transmitting, by the application server 104, to the first operator device 108a of the first security operator 109a, the surveillance request to patrol the patrol route for security check based on the detection of the security alert. The one or more operations further include identifying, by the application server 104, the one or more sensors of the plurality of sensors that have the sensing range that covers the location of the security alert. The one or more operations further include receiving, by the application server 104, the second sensor data, in real-time or near real-time, from the identified one or more sensors based on the location of the operator device 108a being same as the location of the security alert. The one or more operations further include re-training, by the application server 104, the classification model 138 based on the second sensor data when the feedback received from the first operator device 108a indicates the security alert to be the false positive.

The disclosed embodiments encompass numerous advantages. Exemplary advantages of the disclosed methods include, but are not limited to, providing proactive security to the target area 102. In other words, the target area 102 is monitored in real-time so that any undesirable event may be prevented from happening rather than probing into the event once it has happened. The disclosed system is an interconnected system including the application server 104 and the plurality of sensors that seamlessly enables "automated security" by monitoring, analysis, alerting, physical check, and enforcement in the target area 102. Technological improvements in the application server 104 enables the application server 104 to continuously learn from the feedbacks and statuses provided by the operators 109 and the user 111 and improve accuracy and speed of security alert detection and handling. Further, the application server 104 maintains a record of the previously detected anomalies and actions performed to handle those anomalies, thus the response time of the application server 104 reduces for a subsequent occurrence of a similar security alert. The disclosed methods and systems are AI-assisted and are implemented with existing technology and do not require any additional resources. Further, the disclosed methods and systems allow for round-the-clock security of the target area 102. The disclosed methods and systems also allow for dynamically optimizing a patrol route of the plurality of operators 109 within the target area 102 to ensure that monitoring of the target area 102 is efficient. The disclosed methods and systems require minimal or no human intervention for detecting the occurrence of the undesirable event. Therefore, the disclosed methods and systems significantly reduce manual effort, time, and cost required for monitoring the target area 102 in real-time. The disclosed methods and systems leverage active machine learning to ensure continuous improvement in detection of security threats and alerts. The methods and systems disclosed herein may detect the security alert such as a physical conflict among two or more individuals, structural damage within the target area 102, a law violation, an accident, or the like in real-time and may take an appropriate action to prevent any damage from being caused. The disclosed methods and systems may have application in a plurality of fields such as open-area security systems, closed-area security systems, manufacturing plant surveillance system, or the like. Further, the disclosed methods and systems allows customization of the security alert handling dataset as per various applications and use cases. Thus, the security management system of the disclosure may be deployed for proactive detection and handling of anomalies across various application areas, such as healthcare, traffic regulations, manufacturing, warehouses, premise security, or the like.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the scope of the disclosed subject matter.

Techniques consistent with the disclosure provide, among other features, systems and methods in implementing integrated security management systems. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth scope.

What is claimed is:

1. An integrated security management system, comprising:
a plurality of sensors that are deployed in a geographical area and collectively have a sensing range that covers the geographical area; and
an application server communicatively coupled to the plurality of sensors, wherein the application server is configured to:
receive first sensor data from the plurality of sensors;
provide the first sensor data to a trained classification model as an input;
detect, based on an output of the trained classification model, a security alert in the geographical area;
determine a patrol route that encompasses a location where the security alert is detected;
transmit, to an electronic device of a security operator, a surveillance request to patrol the patrol route for security check based on the detection of the security alert;
identify one or more sensors of the plurality of sensors that have a sensing range that covers the location of the security alert;
receive second sensor data, in real-time or near real-time, from the identified one or more sensors based on a location of the electronic device being same as the location of the security alert; and
re-train the classification model based on the second sensor data when a feedback received from the electronic device indicates the security alert to be a false positive.

2. The integrated security management system of claim 1, wherein the application server is further configured to select a starting point of the patrol route based on a current location of the electronic device.

3. The integrated security management system of claim 2, wherein the application server is further configured to select the starting point to be at a minimal distance from the current location of the electronic device.

4. The integrated security management system of claim 1, wherein the application server is further configured to:
transmit keep-alive pings to the plurality of sensors; and
detect a working status of each sensor of the plurality of sensors based on a response received from each sensor of the plurality of sensors with respect to the transmitted keep-alive pings.

5. The integrated security management system of claim 1, wherein the application server is further configured to:
receive, from the electronic device, third sensor data that indicates at least one of a current location of the electronic device, one or more applications running on the electronic device, and an interaction sequence being performed via a user interface of the electronic device;
detect a period of inactivity of the electronic device based on the third sensor data; and
communicate an alert notification to the electronic device based on the detected period of inactivity being greater than a threshold value.

6. The integrated security management system of claim 1, wherein the application server is further configured to:
collect, from a database, a log of historical security alerts and corresponding surveillance actions that have been executed for handling each of the historical security alerts;
create a training dataset comprising the collected historical security alerts and corresponding surveillance actions; and
train the classification model for security alert detection based on the training dataset, wherein the classification model learns one or more rules for detection of the security alert based on the training.

7. The integrated security management system of claim 6, wherein the application server is further configured to re-train the classification model to at least one of modify the learned one or more rules or learn one or more new rules, and wherein the classification model is re-trained based on the feedback received from the electronic device.

8. The integrated security management system of claim 1, wherein the classification model is a deep learning model.

9. The integrated security management system of claim 1, wherein the electronic device is communicatively coupled to one or more electronic devices of one or more other security operators in the geographical area to form an interconnected security network.

10. The integrated security management system of claim 1, wherein the surveillance request further includes at least one of a task to be performed at the location, a historical log of security alerts associated with the location, and a severity of the surveillance request.

11. The integrated security management system of claim 10, wherein the second sensor data further includes information associated with the task being performed at the location by the security operator.

12. An integrated security management method, comprising:
receiving, by an application server, first sensor data from a plurality of sensors that (i) are communicatively coupled to the application server, (ii) are deployed in a geographical area, and (iii) collectively have a sensing range that covers the geographical area;
providing, by the application server, the first sensor data to a trained classification model as an input;
detecting, by the application server, based on an output of the trained classification model, a security alert in the geographical area;
determining, by the application server, a patrol route that encompasses a location where the security alert is detected;
transmitting, by the application server, to an electronic device of a security operator, a surveillance request to patrol the patrol route for security check based on the detection of the security alert;
identifying, by the application server, one or more sensors of the plurality of sensors that have a sensing range that covers the location of the security alert;
receiving, by the application server, second sensor data, in real-time or near real-time, from the identified one or more sensors based on a location of the electronic device being same as the location of the security alert; and re-training, by the application server, the classification model based on the second sensor data when a feedback received from the electronic device indicates the security alert to be a false positive.

13. The integrated security management method of claim 12, further comprising selecting, by the application server, a starting point of the patrol route based on a current location of the electronic device, wherein the starting point is selected to be at a minimal distance from the current location of the electronic device.

14. The integrated security management method of claim 12, further comprising:
   transmitting, by the application server, keep-alive pings to the plurality of sensors; and
   detecting, by the application server, a working status of each sensor of the plurality of sensors based on a response received from each sensor of the plurality of sensors with respect to the transmitted keep-alive pings.

15. The integrated security management method of claim 12, further comprising:
   receiving, by the application server, from the electronic device, third sensor data indicating at least one of a current location of the electronic device, one or more applications running on the electronic device, and an interaction sequence being performed via a user interface of the electronic device;
   detecting, by the application server, a period of inactivity of the electronic device based on the third sensor data; and
   communicating, by the application server, an alert notification to the electronic device based on the detected period of inactivity being greater than a threshold value.

16. The integrated security management method of claim 12, further comprising:
   collecting, by the application server from a database, a log of historical security alerts and corresponding surveillance actions that have been executed for handling the historical security alerts;
   creating, by the application server, a training dataset comprising the collected historical security alerts and corresponding surveillance actions; and
   training, by the application server, the classification model for security alert detection based on the training dataset, wherein the classification model learns one or more rules for detection of the security alert based on the training.

17. The integrated security management method of claim 16, further comprising re-training, by the application server, the classification model to at least one of modify the learned one or more rules or learn one or more new rules, wherein the classification model is re-trained based on the feedback received from the electronic device.

18. The integrated security management method of claim 12, wherein the electronic device is communicatively coupled to one or more electronic devices of one or more other security operators in the geographical area to form an interconnected security network.

19. The integrated security management method of claim 12, wherein the surveillance request further includes at least one of a task to be performed at the location, a historical log of security alerts associated with the location, and a severity of the surveillance request.

20. The integrated security management method of claim 19, wherein the second sensor data further includes information associated with the task being performed at the location.

* * * * *